United States Patent
Miyasaka

(10) Patent No.: US 10,564,927 B1
(45) Date of Patent: Feb. 18, 2020

(54) SIGNAL PROCESSING APPARATUS AND SIGNAL PROCESSING METHOD

(71) Applicant: SOCIONEXT INC., Kanagawa (JP)

(72) Inventor: Shuji Miyasaka, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 16/405,696

(22) Filed: May 7, 2019

(30) Foreign Application Priority Data

Nov. 30, 2018 (JP) ................................ 2018-224921

(51) Int. Cl.
G06F 3/16 (2006.01)
H04R 3/04 (2006.01)

(52) U.S. Cl.
CPC .............. *G06F 3/165* (2013.01); *H04R 3/04* (2013.01)

(58) Field of Classification Search
CPC .................................. H04R 3/04; G06F 3/165
See application file for complete search history.

(56) References Cited

U.S. PATENT DOCUMENTS

| 10,453,466 | B2* | 10/2019 | Choo | G10L 19/12 |
| 2008/0120118 | A1* | 5/2008 | Choo | G10L 19/0208 704/500 |
| 2012/0065965 | A1* | 3/2012 | Choo | G10L 21/038 704/203 |

FOREIGN PATENT DOCUMENTS

| JP | 2004-184472 A | 7/2004 |
| WO | 2008/129853 A1 | 10/2008 |

* cited by examiner

*Primary Examiner* — Regina N Holder
(74) *Attorney, Agent, or Firm* — McDermott Will & Emery LLP

(57) ABSTRACT

A signal processing apparatus outputs a first coefficient stream that has values assigned to signal streams such that a maximum value of 1 or less is assigned to a signal stream closest to the first reference frequency among signal streams of harmonics appearing in frequency signal of sound, and for the other signal streams, the more distant from the first reference frequency the signal stream is, the smaller the value assigned to the signal stream becomes, generates a folding signal stream by multiplying the signal stream of the frequency signal having the bandwidth W on a lower frequency side than the first reference frequency by the first coefficient stream, and folding the signal stream of the frequency signal having a bandwidth W on the lower frequency side than the first reference frequency by using the first reference frequency as a symmetry axis, and outputs a complemented frequency signal.

13 Claims, 21 Drawing Sheets

(a) Sound signal picked up by recording machine of previous generation (b) Sound signal coded by compression method of previous generation

FIG. 5

11 ↘  Index value is shown in square brackets

| Location in memory | Frequency | Real part | Imaginary part | |
|---|---|---|---|---|
| 0 | 0.0 Hz | Re[0] | Im[0] | |
| 1 | 93.75 Hz | Re[1] | Im[1] | |
| 2 | 187.5 Hz | Re[2] | Im[2] | |
| 3 | 281.25 Hz | Re[3] | Im[3] | |
| ⋮ | ⋮ | ⋮ | ⋮ | |
| 64 | 5995 Hz | Re[64] | Im[64] | |
| ⋮ | ⋮ | ⋮ | ⋮ | |
| 82 | 7687 Hz | Re[82] | Im[82] | |
| 83 | 7781 Hz | Re[83] | Im[83] | ⎫ SL1 |
| 84 | 7875 Hz | Re[84] | Im[84] | |
| 85 | 7968 Hz | Re[85] | Im[85] | ← F1 |
| 86 | 8062 Hz | Re[86] | Im[86] | |
| 87 | 8156 Hz | Re[87] | Im[87] | |
| 88 | 8250 Hz | Re[88] | Im[88] | ⎬ SH1 |
| ⋮ | ⋮ | ⋮ | ⋮ | |
| 106 | 9937 Hz | Re[106] | Im[106] | |
| ⋮ | ⋮ | ⋮ | ⋮ | |
| 253 | 23.7 kHz | Re[253] | Im[253] | |
| 254 | 23.8 kHz | Re[254] | Im[254] | |
| 255 | 23.9 kHz | Re[255] | Im[255] | |

FIG. 7

| Frequency | Coefficient |
|---|---|
| 0.0 Hz | |
| 93.75 Hz | |
| 187.5 Hz | |
| 281.25 Hz | |
| ⋮ | |
| 5995 Hz | C1[21] = 1.0 - (21/21) |
| ⋮ | ⋮ |
| 7687 Hz | C1[3] = 1.0 - (3/21) |
| 7781 Hz | C1[2] = 1.0 - (2/21) |
| 7875 Hz | C1[1] = 1.0 - (1/21) |
| 7968 Hz | |
| 8062 Hz | |
| 8156 Hz | |
| 8250 Hz | |
| ⋮ | |
| 9937 Hz | |
| ⋮ | |
| 23.9 kHz | |

FIG. 8

| Frequency | Coefficient |
|---|---|
| 0.0 Hz | |
| 93.75 Hz | |
| 187.5 Hz | |
| 281.25 Hz | |
| ⋮ | |
| 5995 Hz | $C1[21] = 0.8^{21}$ |
| ⋮ | ⋮ |
| 7687 Hz | $C1[3] = 0.8^{3}$ |
| 7781 Hz | $C1[2] = 0.8^{2}$ |
| 7875 Hz | $C1[1] = 0.8^{1}$ |
| 7968 Hz | |
| 8062 Hz | |
| 8156 Hz | |
| 8250 Hz | |
| ⋮ | |
| 9937 Hz | |
| ⋮ | |
| 23.9 kHz | |

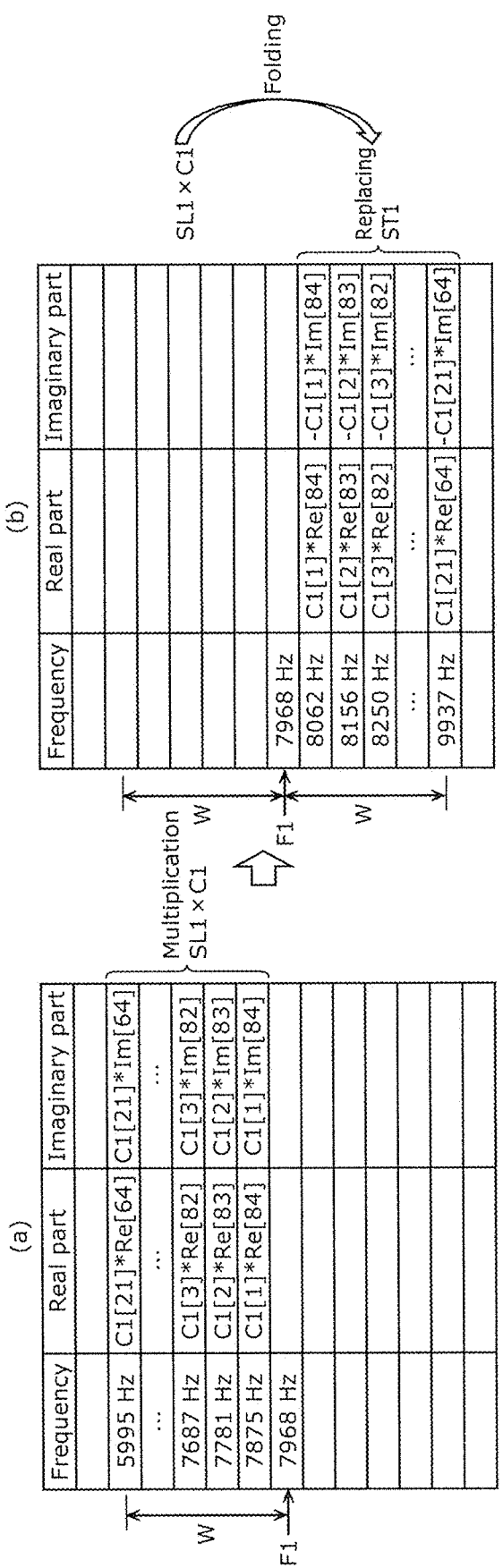

FIG. 17

| Frequency | Real part | Imaginary part |
|---|---|---|
| 0.0 Hz | Re[0] | Im[0] |
| 93.75 Hz | Re[1] | Im[1] |
| 187.5 Hz | Re[2] | Im[2] |
| 281.25 Hz | Re[3] | Im[3] |
| ⋮ | ⋮ | ⋮ |
| 5995 Hz | Re[64] | Im[64] |
| ⋮ | ⋮ | ⋮ |
| 7687 Hz | Re[82] | Im[82] |
| 7781 Hz | Re[83] | Im[83] |
| 7875 Hz | Re[84] | Im[84] |
| 7968 Hz | Re[85] | Im[85] |
| 8062 Hz | Re[86] + C1[1]*Re[84] | Im[86] − C1[1]*Im[84] |
| 8156 Hz | Re[87] + C1[2]*Re[83] | Im[87] − C1[2]*Im[83] |
| 8250 Hz | Re[88] + C1[3]*Re[82] | Im[88] − C1[3]*Im[82] |
| ⋮ | ⋮ | ⋮ |
| 9937 Hz | Re[106] + C1[21]*Re[64] | Im[106] − C1[21]*Im[64] |
| ⋮ | ⋮ | ⋮ |
| 23.7 kHz | | |
| 23.8 kHz | | |
| 23.9 kHz | | |

Addition SH+ST1

W  F1  W

SIGNAL PROCESSING APPARATUS AND SIGNAL PROCESSING METHOD

CROSS REFERENCE TO RELATED APPLICATIONS

The present application is based on and claims priority of Japanese Patent Application No. 2018-224921 filed on Nov. 30, 2018. The entire disclosure of the above-identified application, including the specification, drawings and claims is incorporated herein by reference in its entirety.

FIELD

The present disclosure relates to a signal processing apparatus and a signal processing method that performs reproduction processing of a sound signal.

BACKGROUND

Recently, the frequency characteristics of a sound signal have even reached a high bandwidth. Although the reproduction band of conventional CDs was 22.05 kHz (sampling frequency 44.1 kHz), in the current high-resolution audio system, the reproduction band of 48 kHz (sampling frequency 96 kHz) or 96 kHz (sampling frequency 192 kHz) is also becoming common. On the other hand, since the performance of sound pickup devices of the previous generation was inferior to the performance of sound pickup devices of recent years, high frequency components are not recorded in music contents of the previous generation. Additionally, some music contents lack high frequency components due to compression coding by compression methods of the previous generation.

A signal processing technology of recovering high frequency components for such music contents is known.

For example, Patent Literature 1 discloses a technology of compensating high frequency harmonic components by copying harmonic components remaining in a middle frequency band to high frequencies. Additionally, Patent Literature 2 discloses a technology of compensating high frequency harmonic components by performing folding of low frequency components to high frequency components, when a signal downsampled at a ½ rate is upsampled at twice the rate.

CITATION LIST

Patent Literature

[Patent Literature 1]
Japanese Unexamined Patent Application Publication No. 2004-184472
[Patent Literature 2]
International Publication No. WO 2008/129853

SUMMARY

Technical Problem

However, in the methods disclosed by Patent Literature 1 or Patent Literature 2, there are problems that, when reproducing a sound signal, high frequency harmonic components cannot be sufficiently compensated, and the high sound quality of a reproduction signal cannot be achieved.

The present disclosure has been made in view of the above-described circumstances, and aims at providing a signal processing apparatus, etc. that can achieve the high quality sound of a reproduction signal when reproducing a sound signal.

In accordance with an aspect of the present disclosure, there is provided a signal processing apparatus including a complementary bandwidth determination unit that determines a first reference frequency and a bandwidth based on a frequency signal of sound stored in a memory; a first coefficient stream output unit that outputs a first coefficient stream, the first coefficient stream having values assigned to signal streams of a plurality of harmonics appearing in the frequency signal, the values including a maximum value equal to or less than 1 and other values smaller than the maximum value, the maximum value being assigned to a first signal stream closest to the first reference frequency among the signal streams, the other values being assigned to other signal streams among the signal streams, each of the other values decreasing as a corresponding one of the other signal streams is more distant from the first reference frequency; a first signal stream generation unit that generates a folding signal stream by performing both of multiplication processing and folding processing using the first reference frequency as an upper limit frequency of the frequency signal, the multiplication processing being processing for multiplying a second signal stream among the signal streams by the first coefficient stream, the folding processing being processing for folding the second signal stream to a frequency domain higher than the first reference frequency to be symmetric with respect to the first reference frequency as a symmetry axis, the second signal stream having the bandwidth determined by the complementary bandwidth determination unit on a lower frequency side than the upper limit frequency; and a first signal output unit that outputs complemented frequency signal by replacing a third signal stream among the signal streams by the folding signal stream using the first reference frequency set as a lower limit frequency of the frequency signal, the third signal stream having the bandwidth on a higher frequency side than the lower limit frequency.

In accordance with another aspect of the present disclosure, there is provided a signal processing apparatus including: a complementary bandwidth determination unit that determines a first reference frequency and a bandwidth based on a frequency signal of sound stored in a memory; a first coefficient stream output unit that outputs a first coefficient stream, the first coefficient stream having values assigned to signal streams of a plurality of harmonics appearing in the frequency signal, the values including a maximum value equal to or less than 1 and other values smaller than the maximum value, the maximum value being assigned to a first signal stream closest to the first reference frequency among the signal streams, the other values being assigned to other signal streams among the signal streams, each of the other values decreasing as a corresponding one of the other signal streams is more distant from the first reference frequency; a first signal stream generation unit that generates a folding signal stream by performing both of multiplication processing and folding processing using the first reference frequency as an upper limit frequency of the frequency signal, the multiplication processing being processing for multiplying a second signal stream among the signal streams by the first coefficient stream, the folding processing being processing for folding the second signal stream to a frequency domain higher than the first reference frequency to be symmetric with respect to the first reference frequency as a symmetry axis, the second signal stream having the bandwidth determined by the complementary bandwidth determination unit on a lower frequency side than the upper limit frequency; and a first signal output unit that outputs complemented frequency signal by adding the folding signal stream to a third signal stream among the signal streams using the first reference frequency set as a lower limit frequency of the frequency signal, the third signal stream having the bandwidth on a higher frequency side than the lower limit frequency.

In accordance with still another aspect of the present disclosure, there is provided a signal processing method of processing a frequency signal, the signal processing method comprising: determining a reference frequency and a bandwidth based on the frequency signal of sound stored in a memory; outputting a coefficient stream, the coefficient stream having values assigned to signal streams of a plurality of harmonics appearing in the frequency signal, the values including a maximum value equal to or less than 1 and other values smaller than the maximum value, the maximum value being assigned to a first signal stream closest to the reference frequency among the signal streams, the other values being assigned to other signal streams among the signal streams, each of the other values decreasing as a corresponding one of the other signal streams is more distant from the reference frequency; generating a folding signal stream by performing both of multiplication processing and folding processing using the reference frequency as an upper limit frequency of the frequency signal, the multiplication processing being processing for multiplying a second signal stream among the signal streams by a corresponding one of the values of the coefficient stream, the folding processing being processing for folding the second signal stream to a frequency domain higher than the reference frequency to be symmetric with respect to the reference frequency as a symmetry axis, the second signal stream having the bandwidth determined in the determining on a lower frequency side than the upper limit frequency; and outputting complemented frequency signal by replacing a third signal stream among the signal streams by the folding signal stream using the reference frequency set as a lower limit frequency of the frequency signal, the third signal stream having the bandwidth on a higher frequency side than the lower limit frequency.

In accordance with still another aspect of the present disclosure, there is provided a signal processing method of processing a frequency signal, the signal processing method comprising: determining a reference frequency and a bandwidth based on the frequency signal of sound stored in a memory; outputting a coefficient stream, the coefficient stream having values assigned to signal streams of a plurality of harmonics appearing in the frequency signal, the values including a maximum value equal to or less than 1 and other values smaller than the maximum value, the maximum value being assigned to a first signal stream closest to the reference frequency among the signal streams, the other values being assigned to other signal streams among the signal streams, each of the other values decreasing as a corresponding one of the other signal streams is more distant from the reference frequency; generating a folding signal stream by performing both of multiplication processing and folding processing using the reference frequency as an upper limit frequency of the frequency signal, the multiplication processing being processing for multiplying a second signal stream among the signal streams by a corresponding one of the values of the coefficient stream, the folding processing being processing for folding the second signal stream to a frequency domain higher than the reference frequency to be symmetric with respect to the reference frequency as a symmetry axis, the second signal stream having the bandwidth determined in the determining on a lower frequency side than the upper limit frequency; and outputting complemented frequency signal by adding the folding signal stream to a third signal stream among the signal streams using the reference frequency set as a lower limit frequency of the frequency signal, the third signal stream having the bandwidth on a higher frequency side than the lower limit frequency.

These general and specific aspects may be implemented to a system, a method, an integrated circuit, a computer program, or a computer-readable recording medium such as a Compact Disc-Read Only Memory (CD-ROM), or may be any combination of them.

Solution to Problem

Advantageous Effects

According to the signal processing apparatus, etc. of the present disclosure, it is possible to achieve the high quality sound of the reproduction signal when reproducing the sound signal.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

(a) in FIG. 1 is a diagram illustrating an example of a frequency signal picked up by a recording machine of the previous generation. (b) in FIG. 1 is a diagram illustrating an example of a frequency signal compression-coded by a compression method of the previous generation.

FIG. 5 is a conceptual diagram illustrating the signal stream of a frequency signal stored in a memory of the signal processing apparatus according to Embodiment 1.

FIG. 7 is a diagram illustrating an example of a first coefficient stream generated by a first coefficient stream output unit of the signal processing apparatus according to Embodiment 1.

FIG. 8 is a diagram illustrating another example of the first coefficient stream generated by the first coefficient stream output unit of the signal processing apparatus according to Embodiment 1.

FIG. 9A is a diagram illustrating multiplication processing and folding processing that are performed by the signal processing apparatus according to Embodiment 1 by using the signal stream of the frequency signal.

Figure 12:
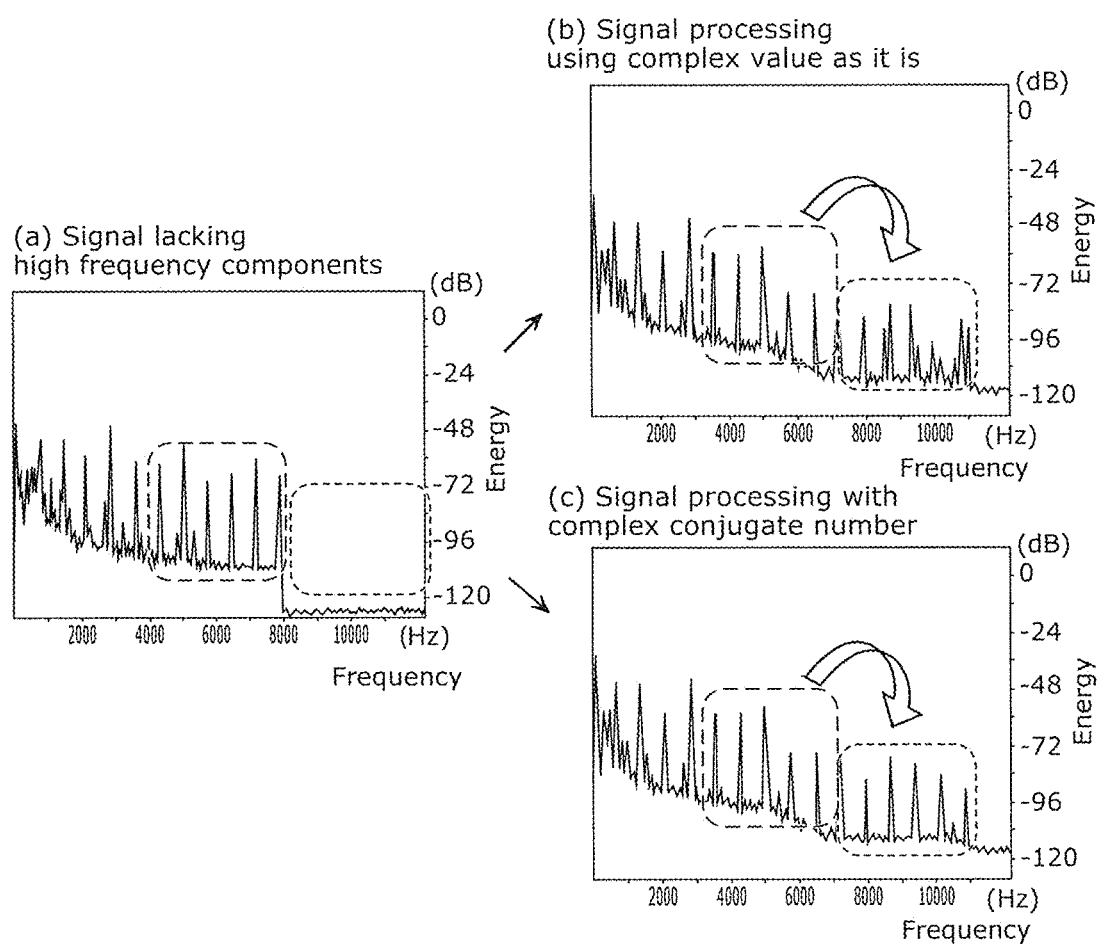

(a) in FIG. 12 is an example of the frequency signal lacking the high frequency components. (b) in FIG. 12 is a frequency signal after performing signal processing that uses a complex value as it is. (c) in FIG. 12 is a diagram illustrating frequency signal after performing signal processing using a complex conjugate number.

Figure 13:
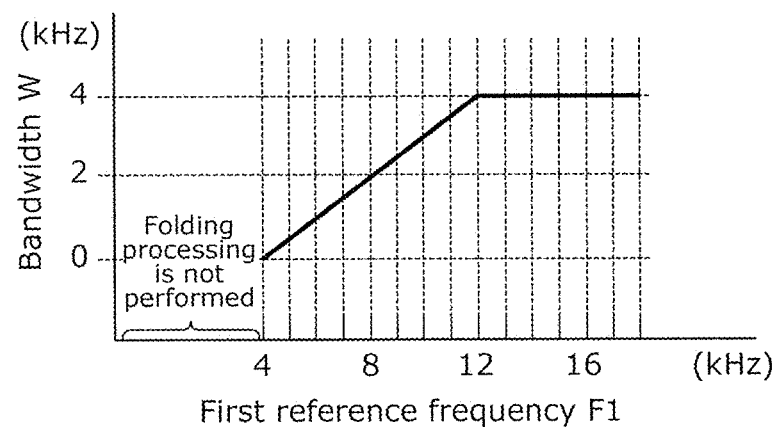

FIG. 13 is a diagram illustrating the relationship between a first reference frequency and a bandwidth determined by a complementary bandwidth determination unit of the signal processing apparatus according to Embodiment 1.

Figure 14:
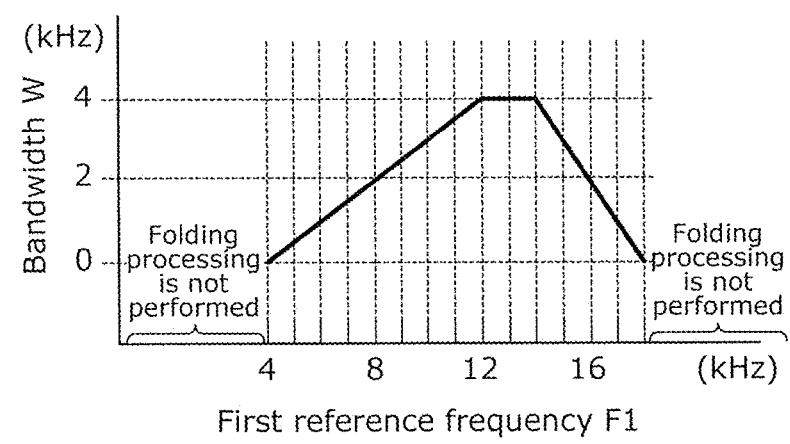

FIG. 14 is a diagram illustrating another example of the relationship between a first reference frequency and a bandwidth determined by the complementary bandwidth determination unit of the signal processing apparatus according to Embodiment 1.

Figure 15:
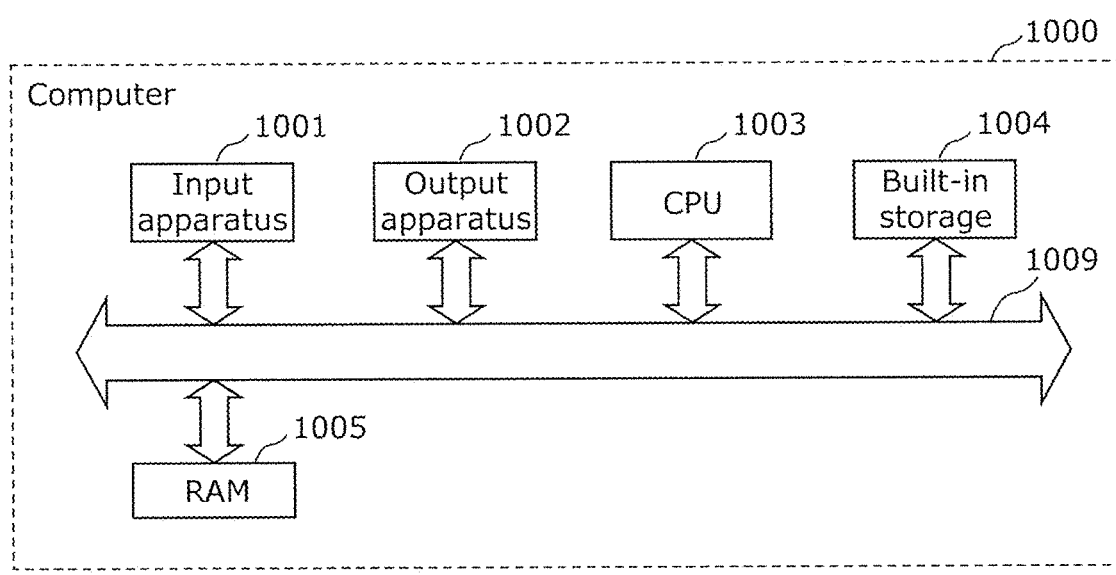

FIG. 15 is a diagram illustrating an example of the hardware configuration of a computer that realizes the functions of the signal processing apparatus of Embodiment 1 with software.

Figure 16:
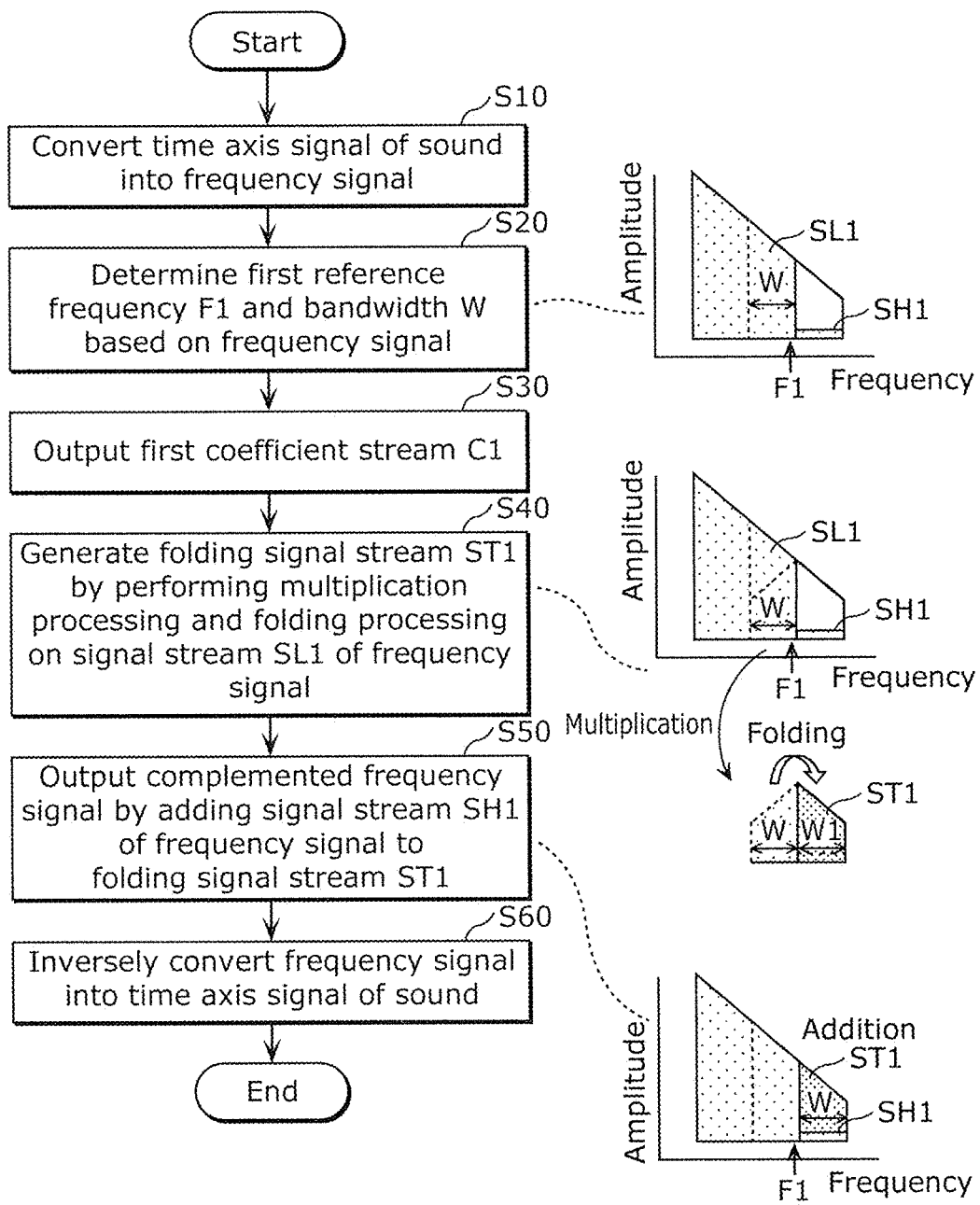

FIG. 16 is a diagram illustrating the processing performed in the first signal output unit of the signal processing apparatus according to a variation of Embodiment 1.

FIG. 17 is a diagram illustrating complemented frequency signal that is output by the first signal output unit according to the variation of Embodiment 1 by using the signal stream of the frequency signal.

Figure 18:
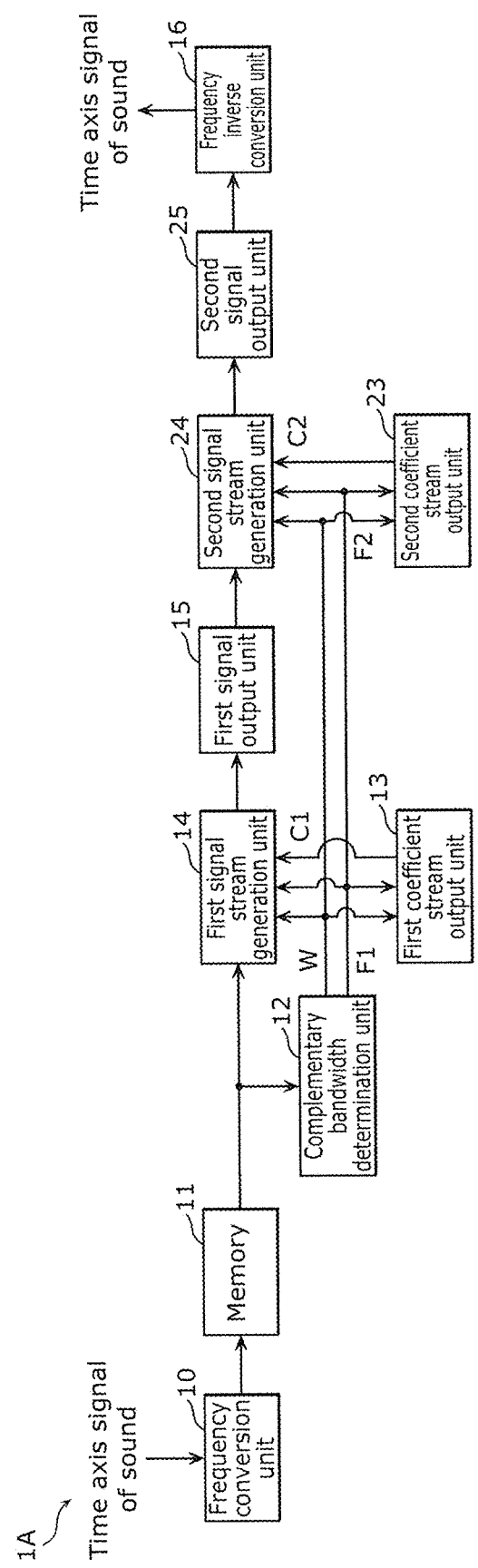

FIG. 18 is a diagram illustrating the configuration of a signal processing apparatus according to Embodiment 2.

Figure 19:
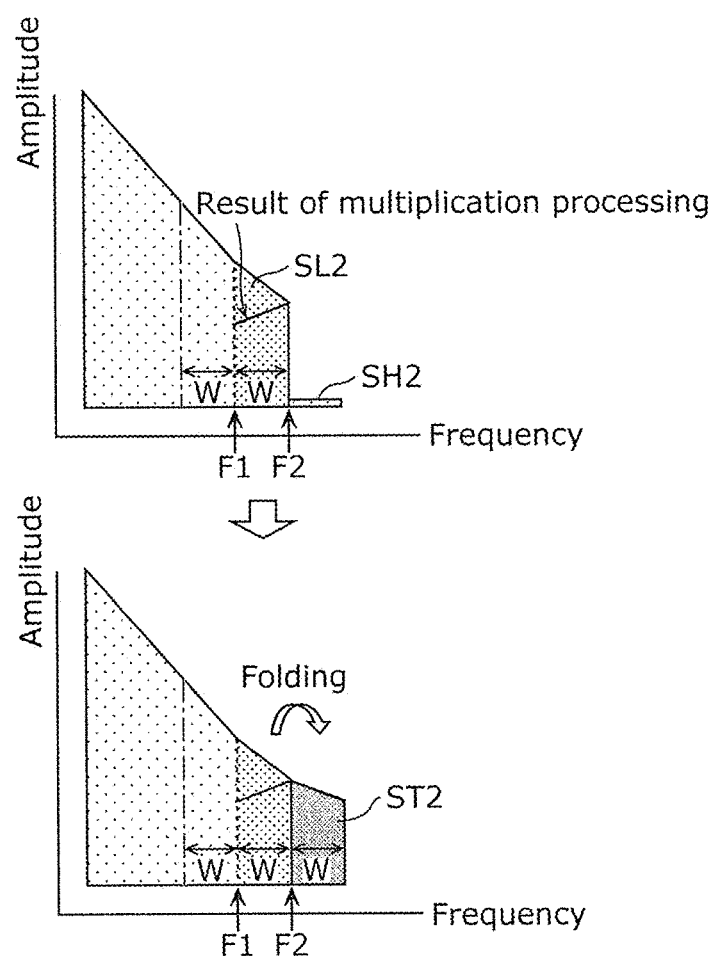

FIG. 19 is a conceptual diagram illustrating the case where signal processing is performed twice in a signal processing method according to Embodiment 2.

Figure 20:
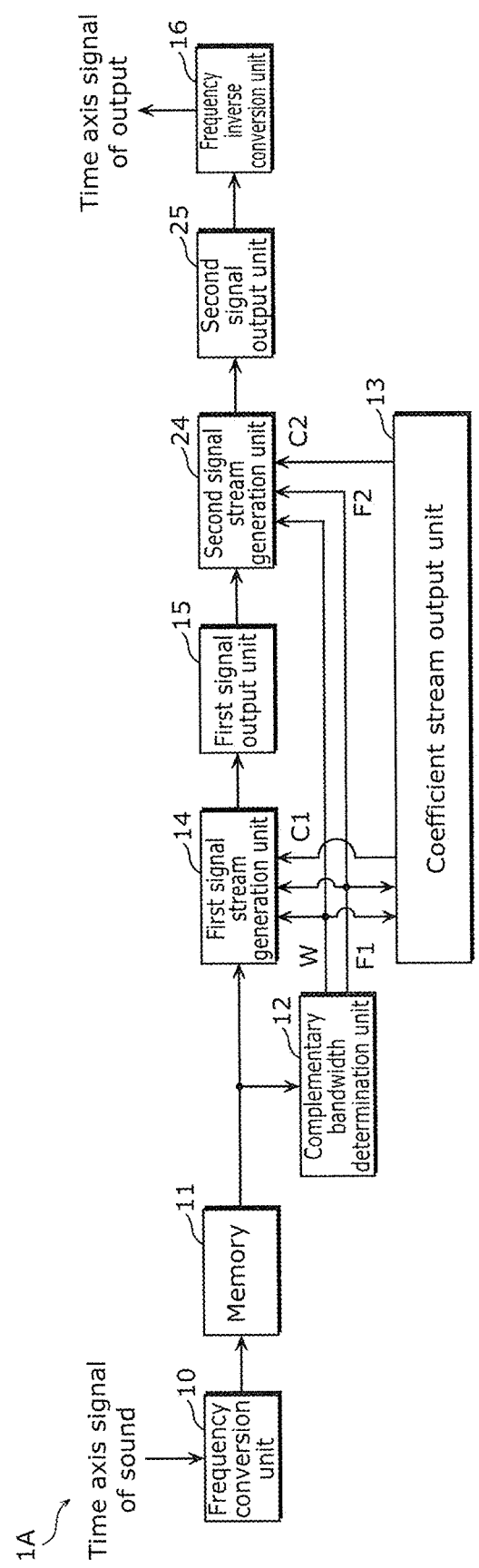

FIG. 20 is a diagram illustrating another example of the configuration of the signal processing apparatus according to Embodiment 2.

Figure 21:
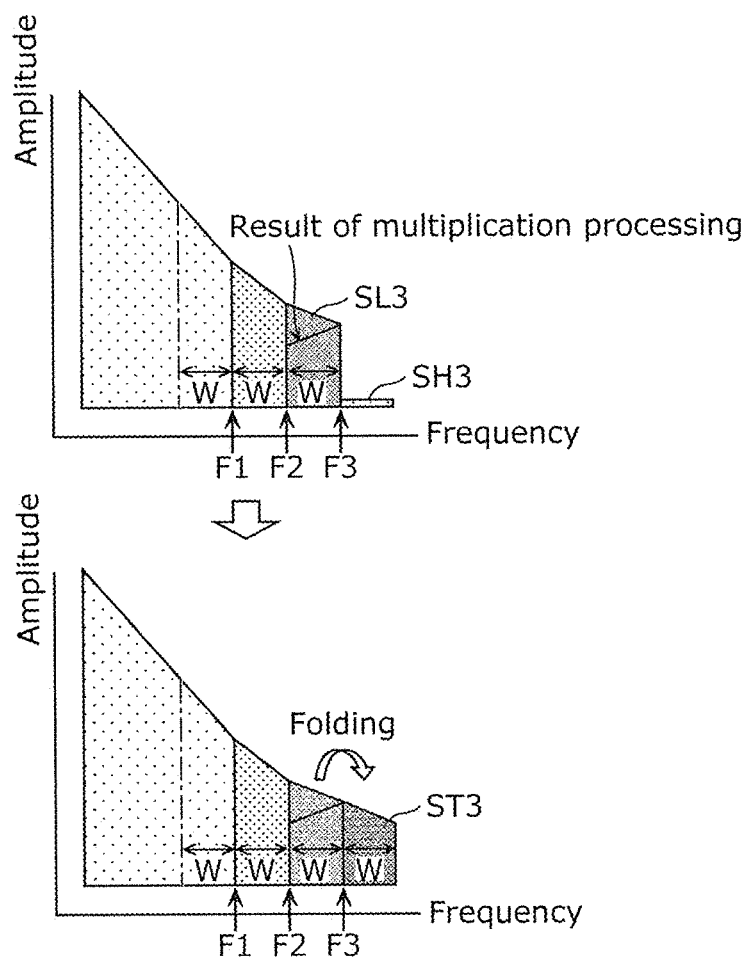

FIG. 21 is a conceptual diagram illustrating another example of the signal processing method according to Embodiment 2, i.e., the case where signal processing is performed three times.

DESCRIPTION OF EMBODIMENTS

Circumstances by which One Aspect of the Present Disclosure has been Conceived

First, referring to FIG. 1 and FIG. 2, a description will be given of the circumstances by which one aspect of the present disclosure has been conceived.

Figure 1:
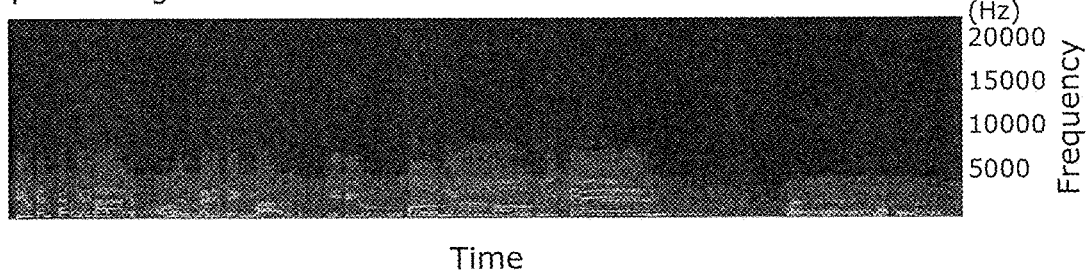
Figure 1:
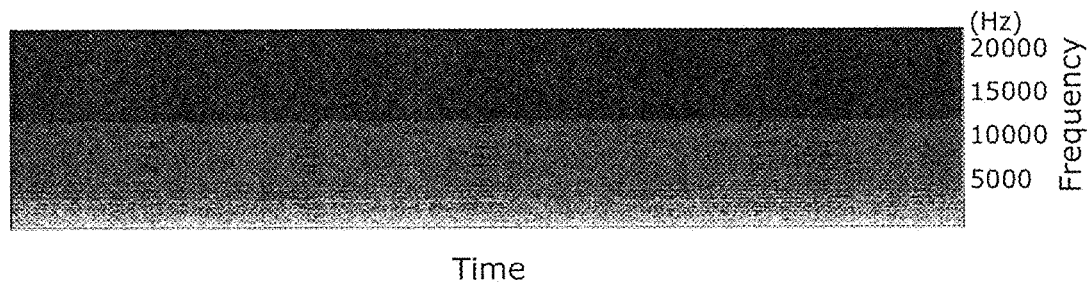

(a) in FIG. 1 is a diagram illustrating frequency components of a signal recorded by a sound pickup device of the previous generation. In (a) in FIG. 1, the horizontal axis represents the time, the vertical axis represents frequency, and the brighter the color is, the stronger the signal becomes. As illustrated in (a) in FIG. 1, in the signal recorded by the sound pickup device of the previous generation, low frequency components are recorded, but most high frequency components are not recorded.

(b) in FIG. 1 is a diagram illustrating frequency components of a signal compression-coded by the MP3 (MPEG Audio Layer-3). As illustrated in FIG. 2, in the signal compression-coded by the MP3, frequency component higher than a predetermined frequency are removed.

The present disclosure provides a signal processing apparatus, etc. that achieves the high quality sound of a reproduction signal by complementing high frequency components to a sound signal whose high frequency components are insufficient (deficient) as described above. Hereinafter, the difference between the conventional signal processing method and the signal processing method according to embodiments will be schematically described.

Figure 2:
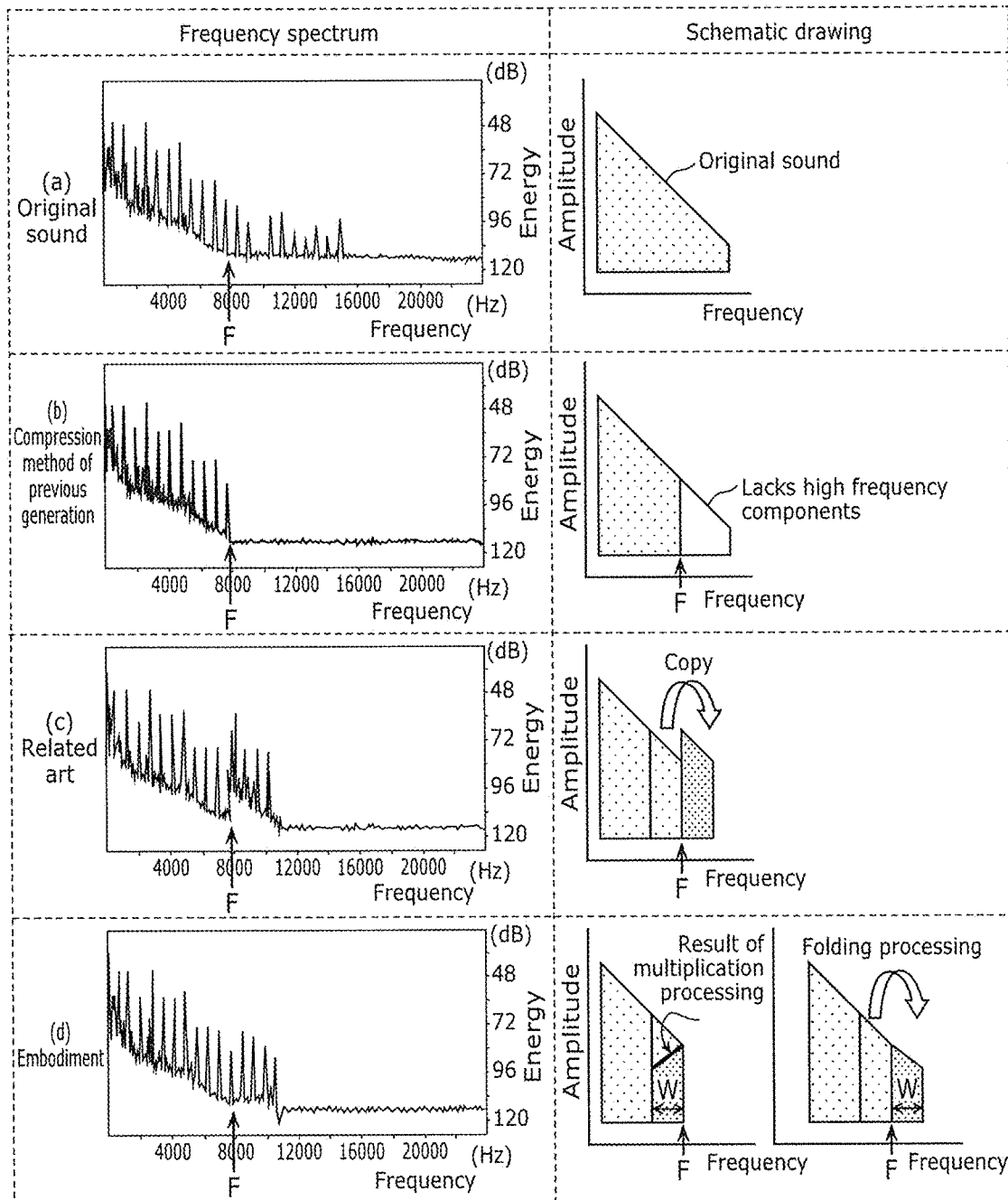
FIG. 2 is a conceptual diagram illustrating the difference between a conventional signal processing method and a signal processing method according to an embodiment.

FIG. 2 is a conceptual diagram illustrating the difference between the conventional signal processing method and the signal processing method according to an embodiment.

(a) in FIG. 2 illustrates the frequency spectrum of the original sound of a musical instrument, such as a harp. As illustrated in (a) in FIG. 2, in a sound signal, a plurality of harmonic components arranged at predetermined intervals in the frequency axis (horizontal axis) direction appear. This diagram illustrates that the harmonic components arranged at, for example, intervals of several 100 Hz sequentially continue to high frequencies.

(b) in FIG. 2 illustrates the frequency spectrum of the sound signal lacking the high frequency harmonic components of the sound signal of the original sound. Although the harmonic components exist in a bandwidth of several kHz (middle frequency) that is on the lower frequency side than a frequency F, the harmonic components hardly exist on the higher frequency side than the frequency F.

(c) in FIG. 2 illustrates the frequency spectrum after complementing the high frequency harmonic components by using a conventional technology. In this conventional technology, the high frequency harmonic components are compensated by merely copying the middle frequency harmonic components of the sound signal to high frequencies with respect to the sound signal illustrated in (b) in FIG. 2.

However, in the method of copying the middle frequency harmonic components to high frequencies, an unnatural level difference is generated at the boundary (near 8 kHz in (c) in FIG. 2) between the copy source frequency domain and the copy destination frequency domain. This level difference is generated because a discontinuous part is generated at the boundary when the middle frequency components are merely copied, since the amplitudes of middle frequencies are larger than the amplitudes of high frequencies. Therefore, unnaturalness remains in the frequency components in the above-described boundary, and the high sound quality of the reproduction signal cannot be achieved.

Figure 6:
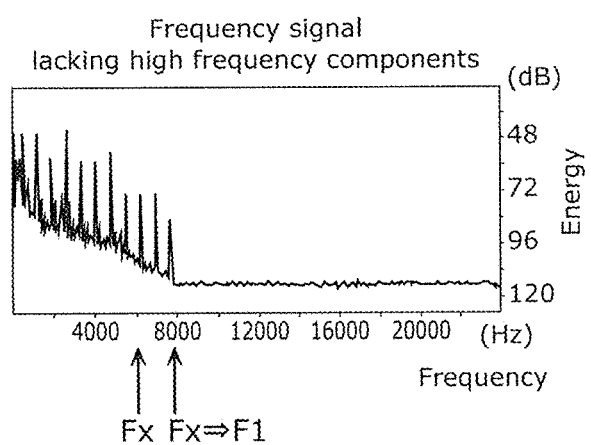
FIG. 6 is a diagram illustrating an example of a frequency signal lacking high frequency components.

Additionally, as another method of complementing the high frequency harmonic components, there is a method of compensating the high frequency harmonic components by performing folding of low frequency components to high frequency components when a signal downsampled at a ½ rate is upsampled at twice the rate (see FIG. 6 of Patent Literature 2). However, when the relationship between the downsampling and the upsampling is not in the relationship between an integer fraction and an integer multiple, for example, when a signal downsampled at a 1/2.03 rate is upsampled at 2.03 times the rate, a high arithmetic capacity is required. Additionally, in the case where the frequency F, which serves as the reference for folding when performing folding of low frequency components to high frequency components, varies with time, a signal necessary for complementing may be unable to be obtained depending on the timing, and it becomes difficult to compensate the high frequency harmonic components.

(d) in FIG. 2 illustrates the frequency spectrum after complementing the high frequency harmonic components by using the signal processing method of this embodiment.

In this embodiment, as illustrated in (d) in FIG. 2, a processing is performed that performs folding of a frequency signal having a bandwidth W on the lower frequency side than the predetermined frequency F of the frequency signal of the sound to a frequency domain higher than the frequency F by using the frequency F as the symmetry axis. In this manner, it becomes difficult for an unnatural level difference to be generated near the frequency F at which the folding is performed. Additionally, in this embodiment, the frequency signal of the sound is analyzed, and the frequency F, which serves as the reference for the folding, is determined based on the analyzed result. Therefore, the frequency F serving as the reference for the folding can be determined according to the sound signal varied with time, and a signal necessary for complementing can be obtained. Because of these reasons, in the signal processing method of the present embodiment, it is possible to achieve the high sound quality of the reproduction signal when reproducing the sound signal.

Hereinafter, the present embodiment will be described in detail by using the drawings. Note that each embodiment described hereinafter illustrates one specific example of the present disclosure. The numerical values, shapes, materials, components, arrangement positions and connection modes of component, usage procedures, communication procedures, etc. illustrated in the following embodiment are examples, and are not intended to limit the present disclosure. Additionally, among the components in the following embodiment, the components not described in the independent claims, which illustrates the highest concept of the present disclosure, will be described as optional components. In addition, each diagram is not necessarily a precisely illustrated diagram. In each diagram, the same numerals are assigned to substantially the same configurations, and an overlapping description will be omitted or simplified.

Embodiment 1

1-1. Configuration of Signal Processing Apparatus

Figure 3:
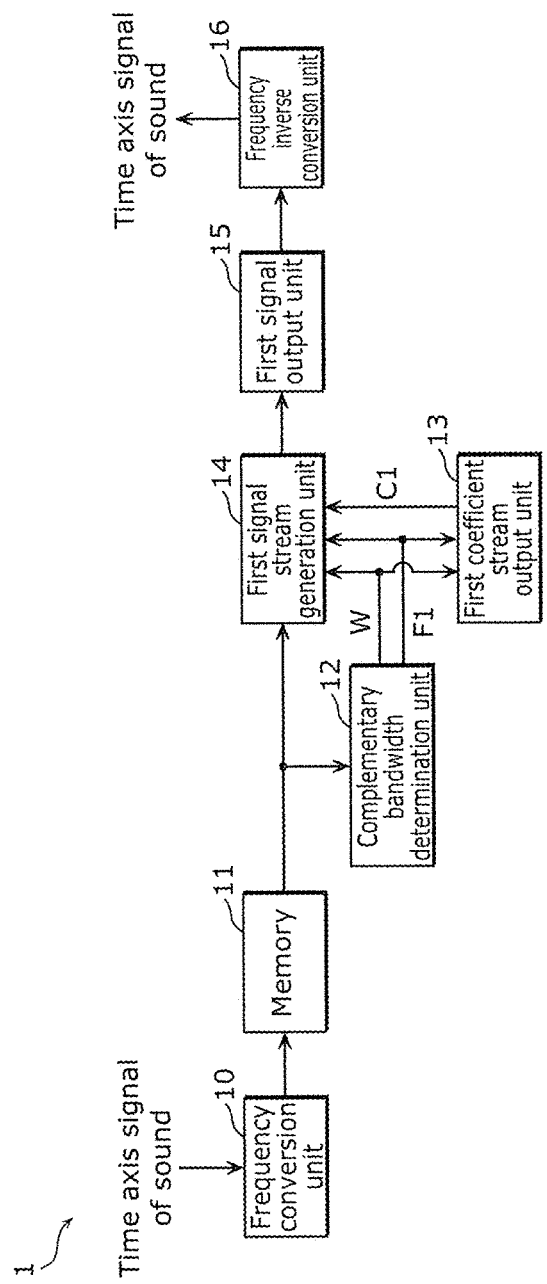
FIG. 3 is a diagram illustrating the configuration of a signal processing apparatus according to Embodiment 1.

Referring to FIG. 3, the configuration of a signal processing apparatus 1 according to Embodiment 1 will be described.

FIG. 3 is a diagram illustrating the configuration of the signal processing apparatus 1 according to Embodiment 1.

The signal processing apparatus 1 includes a complementary bandwidth determination unit 12, a first coefficient stream output unit 13, a first signal stream generation unit 14, and a first signal output unit 15. Additionally, the signal processing apparatus 1 includes a frequency conversion unit 10, a memory 11, and a frequency inverse conversion unit 16.

The frequency conversion unit 10 is a circuit that converts a time axis signal of sound input to the frequency conversion unit 10 into a frequency signal of the sound.

The memory 11 is a circuit that stores the frequency signal output from the frequency conversion unit 10. Note that the frequency signal of the sound is digital signals representing a frequency spectrum.

The complementary bandwidth determination unit 12 is a circuit that receives the frequency signal from the memory 11, and determines a first reference frequency F1 and the bandwidth W based on the frequency signal.

The first reference frequency F1 is the frequency that serves as the reference for the folding when performing the folding processing described above. The complementary bandwidth determination unit 12 obtains and analyzes the frequency signal of the sound, and determines the frequency whose energy of frequency components significantly falls as the first reference frequency F1. The bandwidth W is the width of frequencies for determining a complementary domain when complementing harmonic components. The complementary bandwidth determination unit 12 determines the bandwidth W to be complemented, according to the value of the first reference frequency F1. The complementary bandwidth determination unit 12 outputs the information about the determined first reference frequency F1 and bandwidth W to the first coefficient stream output unit 13 and the first signal stream generation unit 14, respectively.

The first coefficient stream output unit 13 is a circuit that generates and outputs a first coefficient stream C1 (see FIG. 7). The first coefficient stream output unit 13 receives the information about the first reference frequency F1 and bandwidth W from the complementary bandwidth determination unit 12, and generates the first coefficient stream C1. The first coefficient stream C1 is a coefficient stream having values such that the maximum value equal to or less than 1 is assigned to a signal stream of a harmonic closest to the first reference frequency F1 among the signal streams of a plurality of harmonics appearing in the above-described frequency signal, and for the signal streams distant from the first reference frequency F1, in other words, for the other signal streams than the closest signal stream, the more distant from the first reference frequency F1 the signal stream is, the smaller the value assigned to the signal stream becomes, in other words, the value decreases as a distance from the first reference frequency F1 increases. As an example of the first coefficient stream C1, there is an arithmetic progression or a geometric progression in which a first term is 1 or less, and the values are monotonically decreased from the first term.

Note that the first coefficient stream output unit 13 may output a coefficient stream generated by calculation, may read and output a coefficient stream stored in the memory 11 in advance, or may output a coefficient stream stored in a not-shown storage area inside the first coefficient stream output unit 13.

The first signal stream generation unit 14 is a circuit that generates a folding signal stream ST1 for complementing high frequency harmonic components.

The first signal stream generation unit 14 receives the above-described frequency signal from the memory 11, receives the information about the first reference frequency F1 and bandwidth W from the complementary bandwidth determination unit 12, and receives the information about the first coefficient stream C1 from the first coefficient stream output unit 13.

Then, the first signal stream generation unit 14 sets the first reference frequency F1 to the upper limit frequency, and performs multiplication processing that multiplies a signal stream SL1 of a frequency signal having the bandwidth W on the lower frequency side than the upper limit frequency of the above-described frequency signal by the first coefficient stream C1. The multiplication processing is performed by multiplying each signal stream SL1 of the frequency signal by each coefficient of the first coefficient stream C1 corresponding to each signal stream SL1. Additionally, the first signal stream generation unit 14 performs the folding processing that performs folding of the signal stream SL1 of the frequency signal having the bandwidth W on the lower frequency side than the upper limit frequency to a frequency domain higher than the first reference frequency F1 by using the first reference frequency F1 as the symmetry axis. The first signal stream generation unit 14 generates and outputs the folding signal stream ST1 by performing both of these kinds of processing. The first signal stream generation unit 14 may perform both of these kinds of processing simultaneously, or may perform these kinds of processing in a random order.

The first signal output unit 15 is a circuit that outputs the complemented frequency signal. The first signal output unit 15 receives the information about the folding signal stream ST1 from the first signal stream generation unit 14. Then, the first signal stream generation unit 14 sets the first reference frequency F1 to the lower limit frequency, and generates and outputs the complemented frequency signal by replacing the signal stream SH1 of the frequency signal having the bandwidth W on the higher frequency side than the lower limit frequency of the above-described frequency signal with the folding signal stream ST1.

The frequency inverse conversion unit 16 is a circuit that inversely converts the complemented frequency signal to a time axis signal of the sound, and outputs the time axis signal of the sound. Specifically, the frequency inverse conversion unit 16 performs inverse conversion of the frequency signal of the sound, which is output from the first signal output unit 15, and is input to the frequency inverse conversion unit 16, to the time axis signal of the sound. According to this signal processing apparatus 1, it is possible to achieve the high quality sound of the reproduction signal when reproducing the sound signal.

1-2. Signal Processing Method

Next, referring to FIG. 4 to FIG. 15 in addition to FIG. 3, a description will be given of the detailed configurations of the signal processing method and the signal processing apparatus 1 according to the present embodiment.

Figure 4:
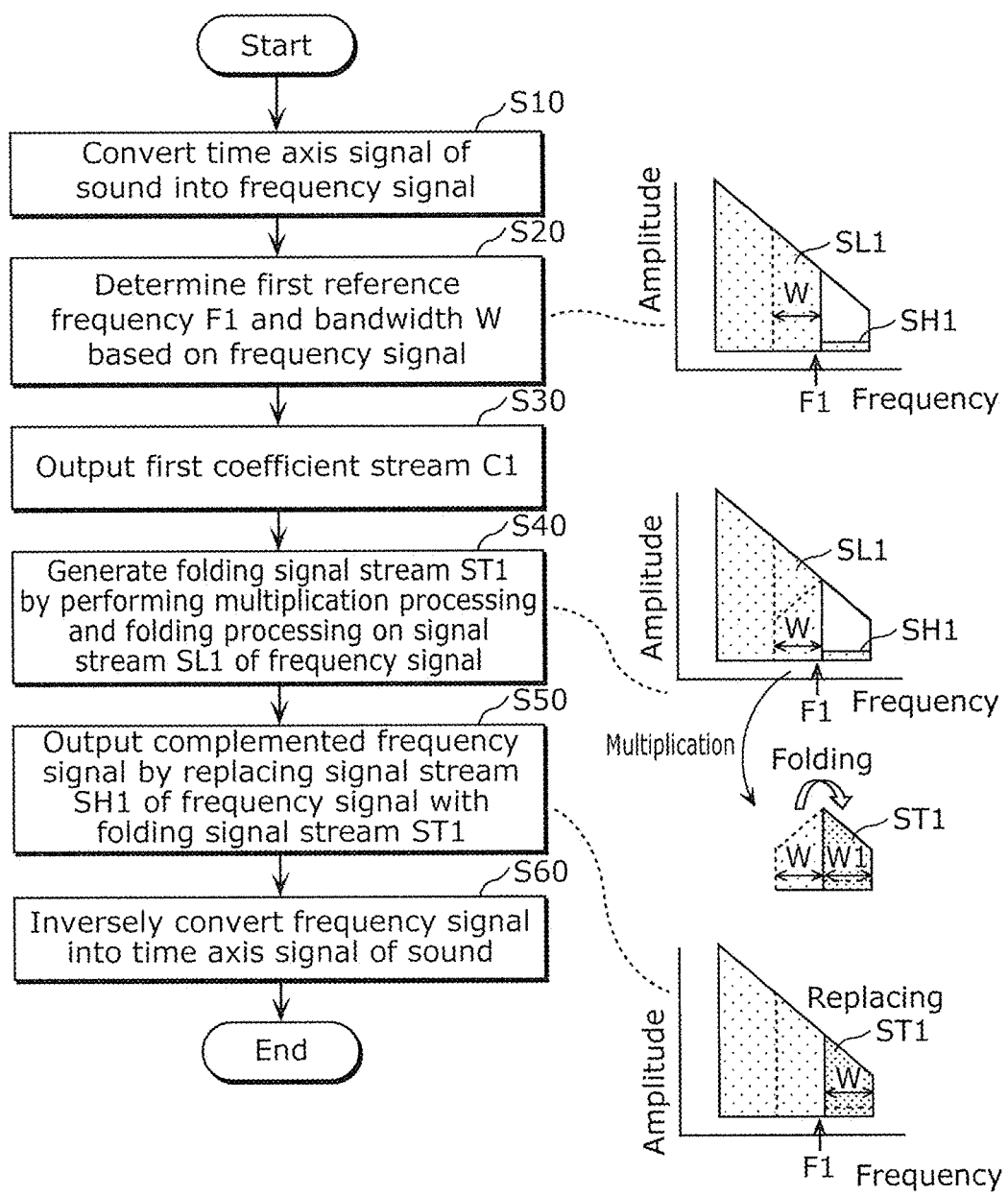
FIG. 4 is a flowchart illustrating a signal processing method according to Embodiment 1, and a conceptual diagram illustrating the signal processing method.

FIG. 4 is a flowchart illustrating the signal processing method according to Embodiment 1, and a conceptual diagram illustrating the signal processing method.

As illustrated in FIG. 4, the signal processing method according to the present embodiment includes a converting step (S10) that converts the time axis signal of the sound into a frequency signal, a zone determination step (S20) that determines the first reference frequency F1 and the bandwidth W, a coefficient stream output step (S30) that outputs the first coefficient stream C1, a signal stream generation step (S40) that generates the folding signal stream ST1, a signal output step (S50) that outputs the complemented frequency signal by replacing the signal stream SH1 of the frequency signal with the folding signal stream ST1, and an inverse conversion step (S60) that performs inverse conversion of the complemented frequency signal to the time axis signal of the sound. Hereinafter, each of the steps will be described in order.

First, in the converting step (S10), the frequency conversion unit 10 converts the time axis signal of the sound input to the frequency conversion unit 10 into the frequency signal of the sound, and outputs the frequency signal of the sound. The frequency conversion unit 10 converts the input time axis signal into the frequency signal of a complex number by using, for example, the Fourier transform. Note that the above is merely an example, and the frequency conversion unit 10 may convert the time axis signal into the frequency signal by using a filter bank, etc. The signal that is output from the frequency conversion unit 10 is stored in the memory 11.

FIG. 5 is a conceptual diagram illustrating the frequency signal stored in the memory 11 of the signal processing apparatus 1.

FIG. 5 illustrates the state where the time axis signal with a sampling frequency of 48 kHz is converted into a 256-point complex Fourier series, and is stored in the memory 11. Since the sampling frequency is 48 kHz, the frequency resolution is 93.75 Hz (=24000/256). The 256-point complex frequency signal is stored in the memory 11 with this frequency resolution up to 24 kHz, which is the Nyquist frequency.

Next, in the zone determination step (S20), the complementary bandwidth determination unit 12 determines the first reference frequency F1 and the bandwidth W based on the frequency signal stored in the memory 11.

The first reference frequency F1 is the frequency in the case where a low frequency component value PL, which indicates the magnitude of a frequency component lower than the first reference frequency F1, becomes sufficiently larger than a high frequency component value Ph, which indicates the magnitude of a frequency component higher than the first reference frequency F1, when the low frequency component value PL is compared with the high frequency component value Ph.

FIG. 6 is a diagram illustrating an example of the frequency signal lacking the high frequency component. For example, in FIG. 6, since there are many frequency components in low frequencies, and less frequency components in high frequencies with the boundary being a frequency of 8 kHz, the first reference frequency F1 is set to 8 kHz.

Here, an example of the procedure for calculating the first reference frequency F1 is described below. First, the complementary bandwidth determination unit 12 temporarily sets a candidate frequency Fx, serving as a candidate of the first reference frequency F1, to 6 kHz. Then, as indicated by (Formula 1), the sum of the magnitudes of frequency components equal to or less than the candidate frequency Fx is calculated as a low frequency component value PL.

$$PL = \Sigma Re[i] * Im[i] \qquad \text{(Formula 1)}$$

Symbol "i" in Formula 1 is an index value equal to or less than an index of the memory 11 (see FIG. 5) storing a 6-kHz signal.

Additionally, as indicated by (Formula 2), the sum of the magnitudes of frequency components equal to or more than the candidate frequency Fx is calculated as a high frequency component value Ph.

$$Ph = \Sigma Re[j] * Im[j] \qquad \text{(Formula 2)}$$

Symbol "j" in Formula 2 is an index value equal to or more than the index of the memory 11 (see FIG. 5) storing the 6-kHz signal.

Based on Formula 1 and Formula 2, when the condition is satisfied in which the low frequency component value PL is equal to or higher than the high frequency component value Ph by a predetermined threshold value, for example, equal to or higher than 24 dB, the complementary bandwidth determination unit 12 determines the candidate frequency Fx to the first reference frequency F1.

When the candidate frequency Fx is set to 6 kHz in the signal having the frequency components illustrated in FIG. 6, since the low frequency component value PL does not satisfy the condition to be equal to or higher than the threshold value, the candidate frequency Fx of 6 kHz is not adopted. Then, the candidate frequency Fx is changed to a different value, and the candidate frequency Fx that satisfies the condition to be equal to or higher than the threshold value is looked for.

On the other hand, when the candidate frequency Fx is set to 8 kHz, since the low frequency component value PL satisfies the condition to be equal to or more than the threshold value, the candidate frequency Fx of 8 kHz is determined as the first reference frequency F1. Note that, though the predetermined threshold value is set to 24 dB in the above, the predetermined threshold value is not limited to this value, and may be set to 18 dB.

Next, the bandwidth W is described. The complementary bandwidth determination unit 12 determines the bandwidth W according to the first reference frequency F1. The bandwidth W is determined from the range of, for example, 2 kHz or more to 4 kHz or less. When the first reference frequency F1 is a high frequency, the bandwidth W may be wide, but when the first reference frequency F1 is a low frequency, it is better for the bandwidth W to be narrow. For example, when the first reference frequency F1 is 8 kHz, the bandwidth W may be set to 2 kHz, and when the first reference frequency F1 is 12 kHz, the bandwidth W may be set to 4 kHz. The reason for setting a narrow bandwidth W when the first reference frequency F1 is a low frequency is that, if a wide bandwidth W is set and the folding processing is performed on frequency components in a low frequency band, distortion of the reproduction signal will be perceived as annoying.

Hereinafter, in the present embodiment, a description will be given of the case where the first reference frequency F1 is 8 kHz, and the bandwidth W is 2 kHz as an example.

Next, in the coefficient stream output step (S30), the first coefficient stream output unit 13 receives the above-described first reference frequency F1 and bandwidth W from the complementary bandwidth determination unit 12, and generates the first coefficient stream C1. Here, the relationship between the first coefficient stream C1 and the signal stream of the frequency signal stored in the memory 11 will be described.

In the memory 11 illustrated in FIG. 5, among the signal streams of the frequency signal, the place where an about 8 kHz frequency signal, which is the first reference frequency F1, is stored is a place where a 7968 Hz signal is stored (the 85th location in the memory in the row direction). Additionally, the place where about 6 kHz frequency signal, which is (the first reference frequency F1−the bandwidth W), is stored is the place where a 5995 Hz signal is stored (the 64th location in the memory). In addition, the place where about 10 kHz frequency signal, which is (the first reference frequency F1+the bandwidth W), is stored is the place where a 9937 Hz signal is stored (the 106th location in the memory).

The first coefficient stream C1 includes, for example, each coefficient corresponding to each of 21 signal streams stored in the 84th location in the memory to the 64th location in the memory among the respective signal streams in these locations in the memory.

FIG. 7 is a diagram illustrating an example of the first coefficient stream C1 generated by the first coefficient stream output unit 13. FIG. 7 illustrates an example in which an arithmetic progression is monotonically decreased as the first coefficient stream C1. Specifically, the coefficient corresponding to the first signal stream closest to the first reference frequency F1 is the first coefficient stream C1[1] =1.0−(1/21)=0.952, and the coefficient corresponding to the 21st signal stream distant from the first reference frequency F1 is the first coefficient stream C1 [21]=1.0−(21/21)=0.0.

FIG. 8 is a diagram illustrating another example of the first coefficient stream C1 generated by the first coefficient stream output unit 13. FIG. 8 illustrates an example in which a geometric progression is monotonically decreased as the coefficient stream. Specifically, the coefficient corresponding to the first signal stream closest to the first reference frequency F1 is the first coefficient stream C1[1]=0.8^1=0.8, and the coefficient corresponding to the 21st signal stream distant from the first reference frequency F1 is the first coefficient stream C1 [21]=0.8^21=0.009.

Note that the first coefficient stream C1 is not limited to the coefficient streams that are monotonically decreased as described above, and may be any coefficient stream as long as it exhibits a decreasing trend. Hereinafter, a description will be given of the first coefficient stream C1 that is monotonically decreased with the arithmetic progression illustrated in FIG. 7 as an example.

Next, in the signal stream generation step (S40), the first signal stream generation unit 14 generates the folding signal stream ST1. Specifically, the first signal stream generation unit 14 sets the above-described first reference frequency F1 to the upper limit frequency, and performs both of the multiplication processing that multiplies the signal stream SL1 of the frequency signal having the bandwidth W on the lower frequency side than the upper limit frequency by the first coefficient stream C1, and the folding processing that performs folding of the above-described signal stream SL1 to a frequency domain higher than the first reference frequency F1 by using the first reference frequency F1 as the symmetry axis.

Figure 9B:
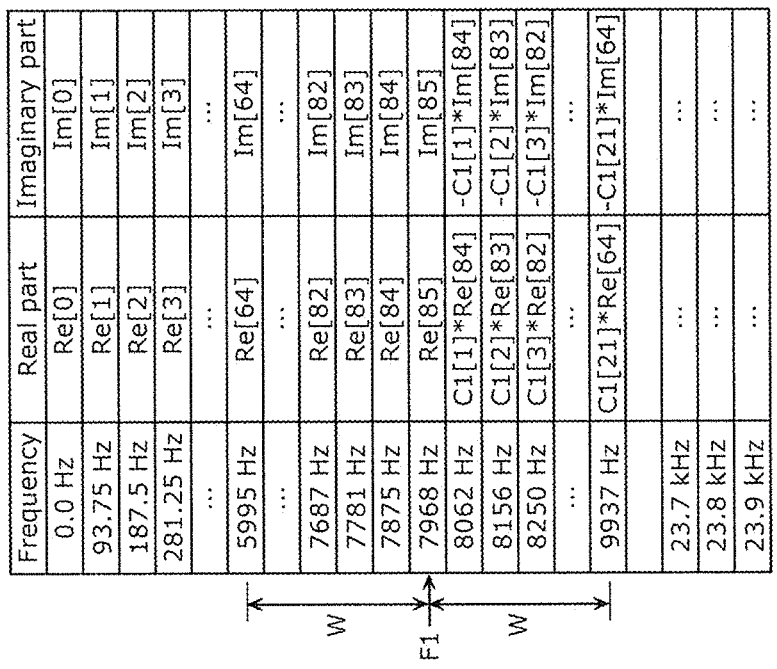
FIG. 9B is a diagram illustrating complemented frequency signal that is output by a first signal output unit of Embodiment 1 by using the signal stream of the frequency signal.

FIG. 9A is a diagram illustrating the multiplication processing and the folding processing that are performed by the signal processing apparatus 1 with the signal streams of the frequency signal. FIG. 9B is a diagram illustrating the complemented frequency signal that is output by the first signal output unit 15 with the signal streams of the frequency signal.

As illustrated in FIG. 9A-(a), the first signal stream generation unit 14 multiplies each signal stream SL1 of the frequency signal by each coefficient of the corresponding first coefficient stream C1. Then, as illustrated in FIG. 9A-(b), the first signal stream generation unit 14 generates the folding signal stream ST1 by performing folding of the signal stream SL1 of the frequency signal to a high frequency side by using 7968 Hz, which is the first reference frequency F1, as the symmetry axis. After the multiplication processing and the folding processing are performed on the signal stream SL1 of the frequency signal in this manner, the complemented frequency signal as illustrated in FIG. 9B is output from the first signal output unit 15.

Note that the first signal stream generation unit 14 may perform the folding processing before the multiplication processing.

Figure 10:
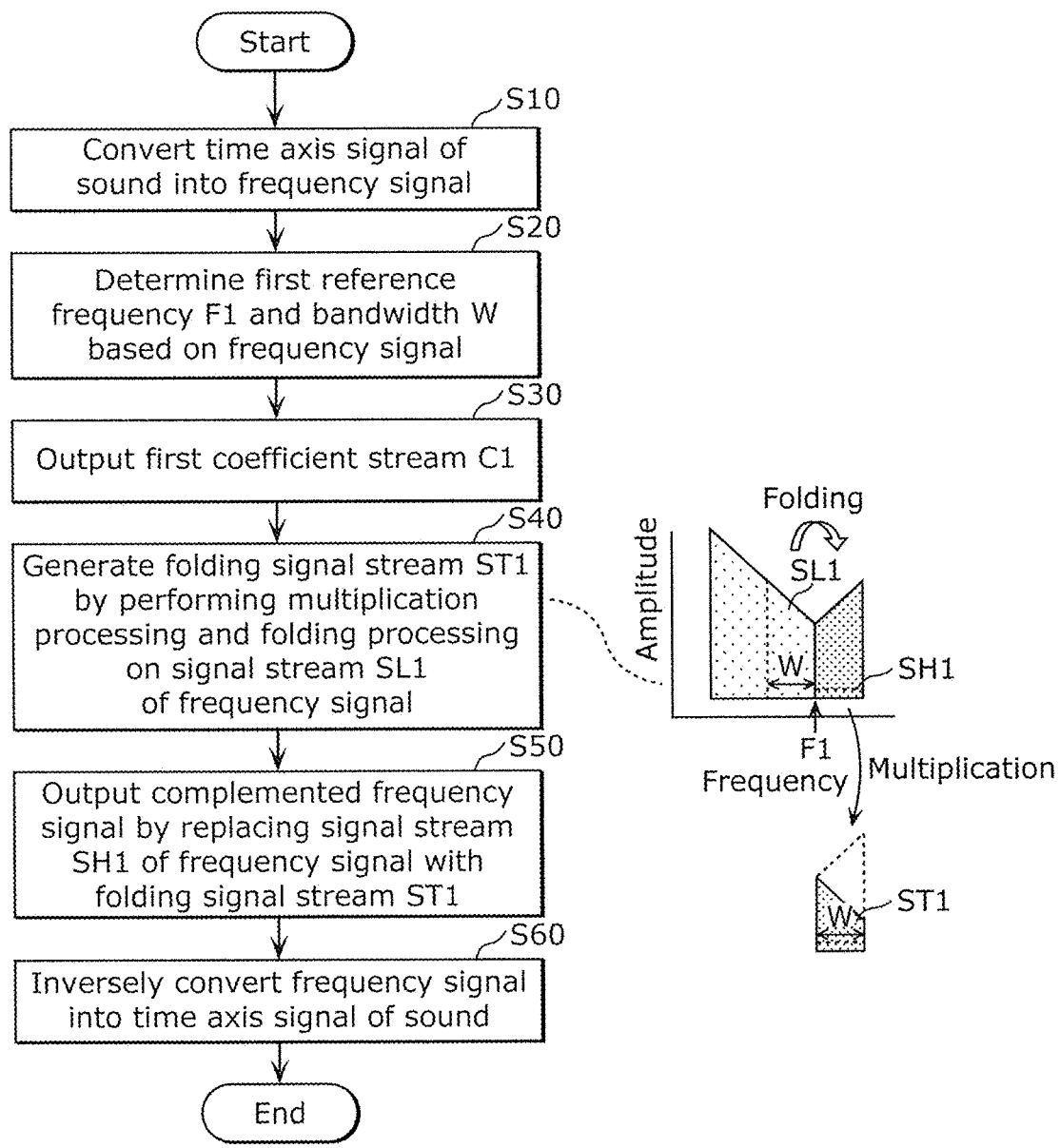
FIG. 10 is a diagram illustrating another example of the multiplication processing and the folding processing that are performed by the first signal stream generation unit of the signal processing apparatus according to Embodiment 1.

FIG. 10 is a diagram illustrating another example of the multiplication processing and the folding processing that are performed by the first signal stream generation unit 14. FIG. 10 illustrates that, after performing the processing of folding of the signal stream SL1 of the frequency signal having the bandwidth W on the lower frequency side than the upper limit frequency to a frequency domain higher than the first reference frequency F1 by using the first reference frequency F1 as the symmetry axis, the processing that multiplies this processed signal stream by the first coefficient stream C1 is performed. In this manner, it is also possible to generate the folding signal stream ST1 by performing the multiplication processing after performing the folding processing. Note that, in the example illustrated in FIG. 10, the multiplication processing is performed on the signal stream after performing the folding processing thereon. However, since the content of the signal stream after performing the folding processing thereon is the signal stream SL1 of the frequency signal having the bandwidth W, it can be said that the multiplication processing is performed on the above-described signal stream SL1 also in this example.

Additionally, the first signal stream generation unit 14 may simultaneously perform these multiplication processing and folding processing. That is, the first signal stream generation unit 14 may set the first reference frequency F1 of the above-described frequency signal to the upper limit frequency, may perform folding of the signal stream SL1 of the frequency signal having the bandwidth W on the lower frequency side than the upper limit frequency to a frequency domain higher than the first reference frequency F1 by using the first reference frequency F1 as the symmetry axis, and may also perform the processing of multiplying the above-described signal stream SL1 by the first coefficient stream C1.

Next, in the signal output step (S50), the first signal output unit 15 outputs the complemented frequency signal (see FIG. 9B). The first signal output unit 15 sets the first reference frequency F1 of the above-described frequency signal to the lower limit frequency, and outputs the complemented frequency signal by replacing the signal stream SH1 of the frequency signal having the bandwidth W on the higher frequency side than the lower limit frequency with the folding signal stream ST1 described above.

Figure 11:
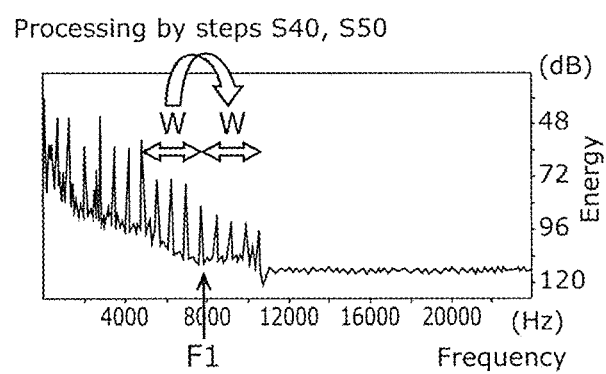
FIG. 11 is a diagram illustrating frequency signal after performing signal processing on the frequency signal lacking the high frequency components illustrated in FIG. 6, by using the signal processing apparatus according to Embodiment 1.

FIG. 11 is a diagram illustrating the frequency signal after performing signal processing on the frequency signal lacking the high frequency components illustrated in FIG. 6 by using the signal processing apparatus 1. FIG. 11 illustrates the state where the signal stream SH1 of the frequency signal having the bandwidth W on the higher frequency side is replaced with the folding signal stream ST1. The frequency signal in a high frequency band is complemented by this replacement. The first signal output unit 15 outputs the complemented frequency signal to the frequency inverse conversion unit 16.

Next, in the inverse conversion step (S60), the frequency inverse conversion unit 16 inversely converts the frequency signal of the sound that is input to the frequency inverse conversion unit 16 into a time axis signal of sound, and outputs the time axis signal. The frequency inverse conversion unit 16 converts the input frequency signal of a complex number into the time axis signal by using, for example, the inverse Fourier transform, and outputs the time axis signal.

As described above, the signal processing apparatus 1 that performs the above-described signal processing method includes the complementary bandwidth determination unit 12, the first coefficient stream output unit 13, the first signal stream generation unit 14, and the first signal output unit 15. The complementary bandwidth determination unit 12 determines the first reference frequency F1 and the bandwidth W based on the frequency signal of the sound stored in the memory 11. The first coefficient stream output unit 13 outputs the first coefficient stream C1 that has values such that the maximum value equal to or less than 1 is assigned to a signal stream closest to the first reference frequency F1 among the signal streams of a plurality of harmonics appearing in the above-described frequency signal, and for the signal streams distant from the first reference frequency F1, the more distant from the first reference frequency F1 the signal stream is, the smaller the value assigned to the signal stream becomes. The first signal stream generation unit 14 generates the folding signal stream ST1 by setting the first reference frequency F1 of the above-described frequency signal to the upper limit frequency, and performing both of the multiplication processing of multiplying the signal stream SL1 of the frequency signal having the bandwidth W on the lower frequency side than the upper limit frequency by the first coefficient stream C1, and the folding processing of performing folding of the above-described signal stream SL1 to a frequency domain higher than the first reference frequency F1 by using the first reference frequency F1 as the symmetry axis. The first signal output unit 15 outputs the complemented frequency signal by setting the first reference frequency F1 of the above-described frequency signal to the lower limit frequency, and replacing the signal stream SH1 of the frequency signal having the bandwidth W on the higher frequency side than the lower limit frequency with the folding signal stream ST1.

According to this configuration, since the adjacent signal streams of the frequency signal in the vicinity of the first reference frequency F1, which serves as the symmetry axis when performing folding of the signal stream SL1 of the frequency signal, have values close to each other, it becomes difficult for an unnatural level difference as in the conventional technology to be generated. Additionally, since the signal stream SL1 of the frequency signal, which is the target of the folding processing, is multiplied by the first coefficient stream C1 that exhibits a decreasing trend, the natural state can be achieved where the amplitudes of high frequencies become smaller than the amplitudes of low frequencies. In addition, since these kinds of signal processing are performed by simplified data processing, such as the folding processing of a signal stream and the multiplication processing of a coefficient stream, the arithmetic load can be reduced.

Note that the first signal stream generation unit 14 may generate each frequency component of the output signal of the first signal stream generation unit 14 by multiplying the complex conjugate number of each frequency component corresponding to the input signal of the first signal stream generation unit 14 by the first coefficient stream C1.

(a) in FIG. 12 is a diagram illustrating an example of the frequency signal lacking the high frequency components, (b) in FIG. 12 is a diagram illustrating the frequency signal after performing signal processing using a complex value as it is, and (c) in FIG. 12 is a diagram illustrating the frequency signal after performing signal processing using a complex conjugate number. In the signal processing method of the present embodiment, it is desirable for the complex frequency signal on which the folding is performed by using the first reference frequency F1 as the symmetry axis to be the complex conjugate number of the frequency signal on which the folding is to be performed. The complex conjugate number is a complex number obtained by reversing the sign of an imaginary part.

For example, when signal processing is performed on the frequency signal illustrated in (a) in FIG. 12 by using the complex value as it is, glitches are generated in sideband waves of harmonic components as illustrated in (b) in FIG. 12. On the other hand, in the case where the signal components of the signal streams that are paired with each other in the folding processing have the relationship of the complex conjugate number, when the frequency signal are inversely converted into the time axis signal in the inverse conversion step (S60), the imaginary component of the time axis is cancelled. In this manner, as illustrated in (c) in FIG. 12, it is possible to generate the time axis signal having a real number component without distortion.

Additionally, as described above, when the first reference frequency F1 is a high frequency, the bandwidth W may be wide, but when the first reference frequency F1 is a low frequency, it is better for the bandwidth W to be narrow. That is, it is desirable for the complementary bandwidth determination unit 12 to make the bandwidth W determined by the complementary bandwidth determination unit 12 narrower than the bandwidth determined when the predetermined frequency is set to the first reference frequency F1, in the case where the first reference frequency F1 is lower than the predetermined frequency.

Here, referring to FIG. 13 and FIG. 14, the relationship between the first reference frequency F1 and the bandwidth W will be described.

FIG. 13 is a diagram illustrating an example of the relationship between the first reference frequency F1 and the bandwidth W. FIG. 14 is a diagram illustrating another example of the relationship between the first reference frequency F1 and the bandwidth W.

As illustrated in FIG. 13 and FIG. 14, it is desirable to make the value of (the first reference frequency F1−the bandwidth W) not less than 4 kHz. This is because a signal of 4 kHz or less is a frequency component that is directly related to the tone, and transferring such a signal to the higher frequency side may not be appropriate. Additionally, as illustrated in FIG. 14, when the first reference frequency F1 is a sufficiently large value, it is desirable to set the value of (the first reference frequency F1+the bandwidth W) not to exceed the predetermined value. This is because, when the first reference frequency F1 is a sufficiently large value, there is less merit in performing the folding processing, since the quality of the original music content is excellent.

Additionally, the signal processing method of the present embodiment may be realized by the hardware configuration of the signal processing apparatus 1 illustrated in FIG. 15. FIG. 15 is a diagram illustrating an example of the hardware configuration of a computer 1000, which realizes the functions of the signal processing apparatus 1 with software.

As illustrated in FIG. 15, the computer 1000 is a computer including an input apparatus 1001, an output apparatus 1002, a CPU 1003, a built-in storage 1004, a RAM 1005, and a bus 1009. The input apparatus 1001, the output apparatus 1002, the CPU 1003, the built-in storage 1004, and the RAM 1005 are connected to each other by the bus 1009.

The input apparatus 1001 is a device serving as a user interfaces, such as an input button, a touchpad, and a touch panel display, and receives a user's operation. Note than the input apparatus 1001 may be configured to receive a voice operation, a remote operation by a remote controller, etc., in addition to receiving a user's contact operation.

The built-in storage 1004 is a flash memory, etc. Additionally, a program for realizing the functions of the signal processing apparatus 1 and/or an application utilizing the functions and configuration of the signal processing apparatus 1 may be stored in the built-in storage 1004 in advance.

The RAM 1005 is Random Access Memory, and is used for storing data, etc. at the time of execution of the program or the application. The CPU 1003 is a Central Processing Unit, and copies the program and the application stored in the built-in storage 1004 to the RAM 1005, sequentially reads instructions included in the program and the application from the RAM 1005, and executes the instructions.

1-3. Effects, Etc.

The signal processing apparatus 1 of the present embodiment includes: the complementary bandwidth determination unit 12 that determines the first reference frequency F1 and the bandwidth W based on the frequency signal of the sound stored in the memory 11; the first coefficient stream output unit 13 that outputs the first coefficient stream C1 that has values such that the maximum value equal to or less than 1 is assigned to a signal stream closest to the first reference frequency F1 among the signal streams of a plurality of harmonics appearing in the above-described frequency signal, and for the signal streams distant from the first reference frequency F1, the more distant from the first reference frequency F1 the signal stream is, the smaller the value assigned to the signal stream becomes; the first signal stream generation unit 14 that generates the folding signal stream ST1 by setting the first reference frequency F1 of the above-described frequency signal to the upper limit frequency, and performing both of the multiplication processing that multiplies the signal stream SL1 of the frequency signal having the bandwidth W on the lower frequency side than the upper limit frequency by the first coefficient stream C1, and the folding processing that performs folding of the above-described signal stream SL1 to a frequency domain higher than the first reference frequency F1 by using the first reference frequency F1 as the symmetry axis; and the first signal output unit 15 that outputs the complemented frequency signal by setting the first reference frequency F1 of the above-described frequency signal to the lower limit frequency, and replacing the signal stream SH1 of the frequency signal having the bandwidth W on the higher frequency side than the lower limit frequency with the folding signal stream ST1.

According to this configuration, since the adjacent signal streams SL1 and SH1 of the frequency signal in the vicinity of the first reference frequency F1, which serves as the symmetry axis when performing folding of the signal stream SL1 of the frequency signal, have values close to each other, it becomes difficult for an unnatural level difference as in the conventional technology to be generated. Additionally, since the signal stream SL1 of the frequency signal, which is the target of the folding processing, is multiplied by the first coefficient stream C1 that exhibits a decreasing trend, the natural state can be achieved where the amplitudes of high frequencies become smaller than the amplitudes of low frequencies. In addition, since the first reference frequency F1 is determined based on the frequency signal of the sound, the first reference frequency F1 can be determined according to the sound signal varied with time, and a signal necessary for complementing can be obtained appropriately. Accordingly, it is possible to achieve the high quality sound of the reproduction signal when reproducing the sound signal.

Additionally, the complementary bandwidth determination unit 12 may determine, as the first reference frequency F1, the frequency with which a deterioration of the energy of the frequency components appearing in the above-described frequency signal is 18 dB or more.

According to this, it is possible to accurately find a portion of the frequency signal of the sound where high frequency components are insufficient, and to complement this insufficient portion with frequency components. Accordingly, it is possible to achieve the high quality sound of the reproduction signal when reproducing the sound signal.

Additionally, the complementary bandwidth determination unit 12 may determine the bandwidth W according to the value of the first reference frequency F1.

By determining the bandwidth W according to the value of the first reference frequency F1 as described above, for example, when the first reference frequency F1 is a low frequency, it becomes possible to make the bandwidth W narrow. According to this, when performing the folding processing of frequency components, it is possible to suppress the distortion of the reproduction signal from being perceived as annoying, and to achieve the high quality sound of the reproduction signal.

Additionally, the complementary bandwidth determination unit 12 may make the bandwidth W determined by the complementary bandwidth determination unit 12 narrower than the bandwidth determined when the predetermined frequency is set to the first reference frequency F1, in the case where the first reference frequency F1 is lower than the predetermined frequency.

As described above, when the first reference frequency F1 is lower than the predetermined frequency, by making the bandwidth W determined by the complementary bandwidth determination unit 12 narrow, it is possible to suppress the distortion of the reproduction signal from being perceived as annoying, when performing the folding processing of the frequency components. Accordingly, it is possible to achieve the high quality sound of the reproduction signal when reproducing the sound signal.

Additionally, the signal processing apparatus 1 may further include: the frequency conversion unit 10 that converts the time axis signal of the sound into the frequency signal of the sound; the memory that stores the frequency signal output from the frequency conversion unit 10; and the frequency inverse conversion unit 16 that inversely converts the complemented frequency signal output from the first signal output unit 15 into the time axis signal of the sound, and outputs the time axis signal.

According to this, the signal processing apparatus 1 can perform signal processing, such as the above-described multiplication processing and folding processing in the state where the time axis signal of the sound is converted into the frequency signal, and can return the frequency signal to the time axis signal of the sound, after performing these kinds of signal processing. Accordingly, it is possible to output sound with which the high quality sound is achieved.

Additionally, the first signal stream generation unit 14 may generate each frequency component of the output signal of the first signal stream generation unit 14 by multiplying the complex conjugate number of each frequency component corresponding to the input signal of the first signal stream generation unit 14 by the first coefficient stream C1.

In this manner, by performing the signal processing with a complex conjugate number by the first signal stream generation unit 14, when the frequency signal is inversely converted into the time axis signal by the frequency inverse conversion unit 16, the imaginary component of the time axis is cancelled. Accordingly, it is possible to generate the time axis signal having a real number component without distortion, and to achieve the high quality sound of the reproduction signal when reproducing the sound signal.

The signal processing method according to the present embodiment is a signal processing method of processing a frequency signal, and includes: a zone determination step that determines the reference frequency (for example, the first reference frequency F1) and the bandwidth W based on the frequency signal of the sound stored in the memory 11; a coefficient stream output step that outputs a coefficient stream (for example, the first coefficient stream C1) that has values such that the maximum value equal to or less than 1 is assigned to a signal stream closest to the reference frequency F1 among the signal streams of a plurality of harmonics appearing in the above-described frequency signal, and for the signal streams distant from the reference frequency F1, the more distant from the reference frequency F1 the signal stream is, the smaller the value assigned to the signal stream becomes; a signal stream generation step that generates the folding signal stream (for example, the folding signal stream ST1) by setting the reference frequency F1 of the above-described frequency signal to the upper limit frequency, and performing both of the multiplication processing of multiplying the signal stream (for example, the signal stream SL1) of the frequency signal having the bandwidth on the lower frequency side than the upper limit frequency by the coefficient stream C1, and the folding processing of performing folding of the above-described signal stream to a frequency domain higher than the reference frequency F1 by using the reference frequency F1 as the symmetry axis; and a signal output step that outputs the complemented frequency signal by setting the reference frequency F1 of the above-described frequency signal to the lower limit frequency, and replacing the signal stream (for example, the signal stream SH1) of the frequency signal having the bandwidth W on the higher frequency side than the lower limit frequency with the folding signal stream ST1.

According to this signal processing method, since the adjacent signal streams SL1 and SH1 of the frequency signal in the vicinity of the first reference frequency F1, which serves as the symmetry axis when performing folding of the signal stream SL1 of the frequency signal, have values close to each other, it becomes difficult for an unnatural level difference as in the conventional technology to be generated. Additionally, since the signal stream SL1 of the frequency signal, which is the target of the folding processing, is multiplied by the first coefficient stream C1 that exhibits a decreasing trend, the natural state can be achieved where the amplitudes of high frequencies become smaller than the amplitudes of low frequencies. In addition, since the first reference frequency F1 is determined based on the frequency signal of the sound, the first reference frequency F1 can be determined according to the sound signal varied with time, and a signal necessary for complementing can be obtained appropriately.

Accordingly, it is possible to achieve the high quality sound of the reproduction signal when reproducing the sound signal.

1-4. Variation of Embodiment 1

Referring to FIG. 16-FIG. 17, the signal processing apparatus 1 according to a variation of Embodiment 1 will be described. The variation is different from Embodiment 1 described above in that the folding signal stream ST1 and the signal stream SH1 of the frequency signal are added.

FIG. 16 is a diagram illustrating the processing performed by the first signal output unit 15 of the signal processing apparatus 1 in the variation. FIG. 17 is a diagram illustrating the complemented frequency signal that is output from the first signal output unit 15 according to the variation with the signal stream of the frequency signal.

In the variation of the embodiment, the first signal output unit 15 outputs the complemented frequency signal in the signal output step (S50). Specifically, the first signal output unit 15 outputs the complemented frequency signal by setting the first reference frequency F1 of the above-described frequency signal to the lower limit frequency, and adding the folding signal stream ST1 to the signal stream SH1 of the frequency signal having the bandwidth W on the higher frequency side than the lower limit frequency (see FIG. 17). According to the signal processing apparatus 1 in the variation, it is possible to achieve the high sound quality of the reproduction signal when reproducing the sound signal, while making use of components on the higher frequency side of the original sound.

The signal processing apparatus 1 according to the variation of the embodiment includes: the complementary bandwidth determination unit 12 that determines the first reference frequency F1 and the bandwidth W based on the frequency signal of the sound stored in the memory 11; the first coefficient stream output unit 13 that outputs the first coefficient stream C1 that has values such that the maximum value equal to or less than 1 is assigned to a signal stream closest to the first reference frequency F1 among the signal streams of a plurality of harmonics appearing in the above-described frequency signal, and for the signal streams distant from the first reference frequency F1, the more distant from the first reference frequency F1 the signal stream is, the smaller the value assigned to the signal stream becomes; the first signal stream generation unit 14 that generates the folding signal stream ST1 by setting the first reference frequency F1 of the above-described frequency signal to the upper limit frequency, and performing both of the multiplication processing that multiplies the signal stream SL1 of the frequency signal having the bandwidth W on the lower frequency side than the upper limit frequency by the first coefficient stream C1, and the folding processing that performs folding of the above-described signal stream SL1 to a frequency domain higher than the first reference frequency F1 by using the first reference frequency F1 as the symmetry axis; and the first signal output unit 15 that outputs the complemented frequency signal by setting the first reference frequency F1 of the above-described frequency signal to the lower limit frequency, and adding the signal stream SH1 of the frequency signal having the bandwidth W on the higher frequency side than the lower limit frequency to the folding signal stream ST1.

According to this configuration, since the adjacent signal streams SL1 and SH1 of the frequency signal in the vicinity of the first reference frequency F1, which serves as the symmetry axis when performing folding of the signal stream SL1 of the frequency signal, have values close to each other, it becomes difficult for an unnatural level difference as in the conventional technology to be generated. Additionally, since the signal stream SL1 of the frequency signal, which is the target of the folding processing, is multiplied by the first coefficient stream C1 that exhibits a decreasing trend, the natural state can be achieved where the amplitudes of high frequencies become smaller than the amplitudes of low frequencies. In addition, since the first reference frequency F1 is determined based on the frequency signal of the sound, the first reference frequency F1 can be determined according to the sound signal varied with time, and a signal necessary for complementing can be obtained appropriately. Further, it is possible to achieve the high sound quality of the reproduction signal when reproducing the sound signal, while making use of components on the higher frequency side of the original sound.

The signal processing method according to the present embodiment is a signal processing method of processing a frequency signal, and includes: a zone determination step that determines the reference frequency (for example, the first reference frequency F1) and the bandwidth W based on the frequency signal of the sound stored in the memory 11; a coefficient stream output step that outputs a coefficient stream (for example, the first coefficient stream C1) that has values such that the maximum value equal to or less than 1 is assigned to a signal stream closest to the reference frequency F1 among the signal streams of a plurality of harmonics appearing in the above-described frequency signal, and for the signal streams distant from the reference frequency F1, the more distant from the reference frequency F1 the signal stream is, the smaller the value assigned to the signal stream becomes; a signal stream generation step that generates the folding signal stream (for example, the folding signal stream ST1) by setting the reference frequency F1 of the above-described frequency signal to the upper limit frequency, and performing both of the multiplication processing of multiplying the signal stream (for example, the signal stream SL1) of the frequency signal having the bandwidth on the lower frequency side than the upper limit frequency by the coefficient stream C1, and the folding processing of performing folding of the above-described signal stream to a frequency domain higher than the reference frequency F1 by using the reference frequency F1 as the symmetry axis; and a signal output step that outputs the complemented frequency signal by setting the reference frequency F1 of the above-described frequency signal to the lower limit frequency, and adding the signal stream (for example, the signal stream SH1) of the frequency signal having the bandwidth W on the higher frequency side than the lower limit frequency to the folding signal stream ST1.

According to this signal processing method, since the adjacent signal streams SL1 and SH1 of the frequency signal in the vicinity of the first reference frequency F1, which serves as the symmetry axis when performing folding of the signal stream SL1 of the frequency signal, have values close to each other, it becomes difficult for an unnatural level difference as in the conventional technology to be generated. Additionally, since the signal stream SL1 of the frequency signal, which is the target of the folding processing, is multiplied by the first coefficient stream C1 that exhibits a decreasing trend, the natural state can be achieved where the amplitudes of high frequencies become smaller than the amplitudes of low frequencies. In addition, since the first reference frequency F1 is determined based on the frequency signal of the sound, the first reference frequency F1 can be determined according to the sound signal varied with time, and a signal necessary for complementing can be obtained appropriately. Further, it is possible to achieve the high sound quality of the reproduction signal when reproducing the sound signal, while making use of components on the higher frequency side of the original sound.

Embodiment 2

2-1. Configuration of Signal Processing Apparatus

Referring to FIG. 18 and FIG. 19, a signal processing apparatus 1A according to Embodiment 2 will be described. In Embodiment 1, the example is illustrated in which the folding processing, etc. of the frequency components is performed once. In Embodiment 2, the example will be described in which the folding processing, etc. is performed once more.

FIG. 18 is a diagram illustrating the configuration of the signal processing apparatus 1A according to Embodiment 2. FIG. 19 is a conceptual diagram illustrating the case where the signal processing is performed twice in a signal processing method according to Embodiment 2.

As illustrated in FIG. 18, the signal processing apparatus 1A includes the complementary bandwidth determination unit 12 illustrated in Embodiment 1, the first coefficient stream output unit 13, the first signal stream generation unit 14, and the first signal output unit 15, and further includes a second coefficient stream output unit 23, a second signal stream generation unit 24, and a second signal output unit 25. Note that the signal processing apparatus 1A also includes the frequency conversion unit 10, the memory 11, and the frequency inverse conversion unit 16.

The complementary bandwidth determination unit 12 receives a frequency signal from the memory 11, and further, determines a second reference frequency F2 based on this frequency signal. The second reference frequency F2 is a frequency obtained by adding the bandwidth W to the first reference frequency F1. The complementary bandwidth determination unit 12 outputs the information about the determined second reference frequency F2 and the bandwidth W to the second coefficient stream output unit 23 and the second signal stream generation unit 24, respectively.

The second coefficient stream output unit 23 is a circuit that generates and outputs the second coefficient stream C2. The second coefficient stream output unit 23 receives the information about the second reference frequency F2 and the bandwidth W from the complementary bandwidth determination unit 12, and generates the second coefficient stream C2. The second coefficient stream C2 is a coefficient stream that has values such that the maximum value equal to or less than 1 is assigned to a signal stream closest to the second reference frequency F2 among the signal streams of a plurality of harmonics appearing in the above-described frequency signal, and for the signal streams distant from the second reference frequency F2, the more distant from the second reference frequency F2 the signal stream is, the smaller the value assigned to the signal stream becomes. As an example of the second coefficient stream C2, there is an arithmetic progression or a geometric progression in which a first term is 1 or less, and the values are monotonically decreased from the first term.

Each of the second coefficient stream C2 and the first coefficient stream C1 has a gradient showing a decreasing trend. The gradient of the second coefficient stream C2 may be the same as the gradient of the first coefficient stream C1, or may be gentler than the gradient of the first coefficient stream C1. For example, with respect to the first coefficient stream C1 illustrated in Embodiment 1 (see FIG. 7 and FIG. 8), the second coefficient stream C2 may be set as $C2(i)=1.0-i/40$, or may be set as $C2(i)=0.9^i$ ("i" is the i-th location in the memory when seen from the second reference frequency F2). Generally, the higher the frequency is, the gentler the decreasing trend of the amplitude of a frequency signal becomes. Therefore, it is possible to match the amplitude of the complemented frequency signal with the decreasing trend of the amplitude of a general frequency signal by making the gradient of the second coefficient stream C2 gentler than the gradient of the first coefficient stream C1.

The second signal stream generation unit 24 is a circuit that generates a folding signal stream ST2 for complementing high frequency harmonic components. The second signal stream generation unit 24 receives the complemented frequency signal from the first signal output unit 15, receives the information about the second reference frequency F2 and the bandwidth W from the complementary bandwidth determination unit 12, and receives the information about the second coefficient stream C2 from the second coefficient stream output unit 23.

Then, as illustrated in FIG. 19, the second signal stream generation unit 24 sets the second reference frequency F2 of the above-described frequency signal to the upper limit frequency, and performs multiplication processing that multiplies a signal stream SL2 of the frequency signal having the bandwidth W on the lower frequency side than the upper limit frequency by the second coefficient stream C2. Additionally, the second signal stream generation unit 24 performs the folding processing that performs folding of the signal stream SL2 of the frequency signal having the bandwidth W on the lower frequency side than the upper limit frequency to a frequency domain higher than the second reference frequency F2 by using the second reference frequency F2 as the symmetry axis. The second signal stream generation unit 24 generates and outputs the folding signal stream ST2 by performing both of these kinds of processing. The second signal stream generation unit 24 may perform both of these kinds of processing simultaneously, or may perform these kinds of processing in a random order.

The second signal output unit 25 is a circuit that outputs a further complemented frequency signal. The second signal output unit 25 receives the information about the folding signal stream ST2 from the second signal stream generation unit 24. Then, the second signal stream generation unit 24 sets the second reference frequency F2 of the above-described frequency signal to the lower limit frequency, and generates and outputs the further complemented frequency signal by replacing the signal stream SH2 of the frequency signal having the bandwidth W on the higher frequency side than the lower limit frequency with the folding signal stream ST2.

Here, a description will be given of the difference between the case of performing processing twice in total by performing folding of a signal having the bandwidth W by using the first reference frequency F1 as the symmetry axis, and by further performing folding of the signal having the bandwidth W again by using the second reference frequency F2 as the symmetry axis, and the case of performing folding of a signal having a wide bandwidth (for example, 2×W) once by using the first reference frequency F1 as the symmetry axis.

In the example of Embodiment 1, the folding processing of the signal having a frequency band from 6 kHz to 8 kHz is performed to 8 kHz to 12 kHz. However, since the main signal in the frequency band from 6 kHz to 8 kHz is a harmonic content, it is difficult for strangeness to be generated even if the folding processing is performed twice on the higher frequency side. On the other hand, when folding of the signal having a wide bandwidth (2×W) is performed once, folding of the signal in a frequency band from 4 kHz to 8 kHz is performed to 8 kHz to 12 kHz. However, the signal from 4 kHz to 8 kHz may include not only the harmonic content, but also a distinctive frequency component that forms, for example, the phoneme of a consonant. When the folding processing of the signal including such a frequency component to the higher frequency side is performed, strangeness in terms of audibility may be produced. Therefore, the complementary bandwidth determination unit 12 according to Embodiment 2 determines the bandwidth W having a width that is not too wide, according to the frequency value of the first reference frequency F1, and thereafter performs the folding processing twice in total in the two signal stream generation units, i.e., the first signal stream generation unit 14 and the second signal stream generation unit 24. In this manner, strangeness is suppressed from being produced when the folding processing is performed.

2-2. Effects, Etc.

The signal processing apparatus 1A according to the present embodiment further includes: the second coefficient stream output unit 23 that outputs the second coefficient stream C2 that has values such that the maximum value equal to or less than 1 is assigned to a signal stream closest to the second reference frequency F2, which is obtained by adding the bandwidth W to the first reference frequency F1, among the signal streams of a plurality of harmonics appearing in the complemented frequency signal, and for the signal streams distant from the second reference frequency F2, the more distant from the second reference frequency F2 the signal stream is, the smaller the value assigned to the signal stream becomes; the second signal stream generation unit 24 that generates the folding signal stream ST2 by setting the second reference frequency F2 of the complemented frequency signal to the upper limit frequency, and performing both of the multiplication processing that multiplies the signal stream SL2 of the frequency signal having the bandwidth W on the lower frequency side than the upper limit frequency by the second coefficient stream C2, and the folding processing that performs folding of the above-described signal stream SL2 to a frequency domain higher than the second reference frequency F2 by using the second reference frequency F2 as the symmetry axis; and the second signal output unit 25 that outputs the further complemented frequency signal by setting the second reference frequency F2 of the complemented frequency signal to the lower limit frequency, and replacing the signal stream SH2 of the frequency signal having the bandwidth W on the higher frequency side than the lower limit frequency with the folding signal stream ST2.

In this manner, it is possible to achieve further high quality sound of the reproduction signal by performing the above-described multiplication processing and folding processing twice.

Note that it is not necessarily required to provide two coefficient stream output units as illustrated in FIG. 18.

FIG. 20 is a diagram illustrating another example of the configuration of the signal processing apparatus 1A. As illustrated in FIG. 20, the signal processing apparatus 1A may be configured such that the first coefficient stream output unit 13 outputs each of the first coefficient stream C1 and the second coefficient stream C2.

Additionally, the above-described second signal output unit 25 may generate the further complemented frequency signal by adding the signal stream SH2 of the frequency signal to the folding signal stream ST2, instead of replacing the signal stream SH2 of the frequency signal to the folding signal stream ST2.

That is, the signal processing apparatus 1A according to the present embodiment further includes the above-described second coefficient stream output unit 23, the above-described second signal stream generation unit 24, and the second signal output unit 25 that outputs the further complemented frequency signal by setting the second reference frequency F2 of the complemented frequency signal to the lower limit frequency, and adding the signal stream SH2 of the frequency signal having the bandwidth W on the higher frequency side than the lower limit frequency to the folding signal stream ST2.

In this manner, it is possible to achieve further high quality sound of the reproduction signal by performing the above-described multiplication processing and folding processing twice.

Additionally, the gradient of the second coefficient stream C2 may be smaller than the gradient of the first coefficient stream C1.

According to this, the higher the frequency is, the gentler the amplitude of the frequency signal becomes. Therefore, it is possible to match the amplitude with the decreasing trend of the amplitude of a general frequency signal. Accordingly, it is possible to achieve the high quality sound of the reproduction signal when reproducing the sound signal.

Note that, in the above, the example is illustrated in which the folding processing, etc. of the frequency component is performed twice. However, the number of times of the folding processing, etc. is not be limited to twice, and may be three times.

FIG. 21 is a conceptual diagram illustrating another example of the signal processing method according to Embodiment 2, i.e., the case where the signal processing is performed three times.

As illustrated in FIG. 21, in this another example, a third reference frequency F3 is set to the upper limit frequency, and multiplication processing is performed that multiplies a signal stream SL3 of a frequency signal having the bandwidth W in the lower frequency side than the upper limit frequency by a third coefficient stream C3. Additionally, folding processing is performed that perform folding of a signal stream SL3 of the frequency signal having the bandwidth W in the lower frequency side than the upper limit frequency to a frequency domain higher than the third reference frequency F3 by using the third reference frequency F3 as the symmetry axis. A folding signal stream ST3 is generated by performing both of these kinds of processing. Then, a further complemented frequency signal is generated and output by setting the third reference frequency F3 of the above-described frequency signal to the lower limit frequency, and replacing the signal stream SH3 of the frequency signal having the bandwidth W on the higher frequency side than the lower limit frequency with the folding signal stream ST3.

Additionally, the number of times of the folding processing, etc. of the frequency component is not limited to three times, and may be n (n is an integer equal to or more than 1).

That is, the signal processing apparatus 1A according to the present embodiment may further include: an (n+1) coefficient stream output unit that outputs an (n+1)th coefficient stream that has values such that the maximum value equal to or less than 1 is assigned to a signal stream closest to an (n+1)th reference frequency, which is obtained by adding n bandwidths W to the first reference frequency F1, among the signal streams of a plurality of harmonics appearing in the complemented frequency signal, and for the signal streams distant from the (n+1)th reference frequency, the more distant from the (n+1)th reference frequency the signal stream is, the smaller the value assigned to the signal stream becomes; an (n+1)th signal stream generation unit that generates a folding signal stream by setting the (n+1)th reference frequency of the complemented frequency signal to the upper limit frequency, and performing both of multiplication processing that multiplies the signal stream of the frequency signal having the bandwidth W on the lower frequency side than the upper limit frequency by the (n+1)th coefficient stream, and folding processing that performs folding of the above-described signal stream to a frequency domain higher than the (n+1)th reference frequency by using the (n+1)th reference frequency as the symmetry axis; and an (n+1)th signal output unit that outputs the further complemented frequency signal by setting the (n+1)th reference frequency of the complemented frequency signal to the lower limit frequency, and replacing the signal stream of the frequency signal having the bandwidth W on the higher frequency side than the lower limit frequency with the folding signal stream.

Additionally, the signal processing apparatus 1A may further include the above-described (n+1)th coefficient stream output unit, the (n+1)th signal stream generation unit, and the (n+1)th signal output unit that outputs the further complemented frequency signal by setting the (n+1)th reference frequency of the complemented frequency signal to the lower limit frequency, and adding the signal stream of the frequency signal having the bandwidth W on the higher frequency side than the lower limit frequency to the folding signal stream.

Additionally, in the signal processing apparatus 1A, the bandwidth W is not limited to be constant, and the bandwidth may be changed according to the number of times of performing folding. For example, the higher the number of times of performing the folding processing becomes, the more the bandwidth may be increased.

Other Embodiments

Although the signal processing apparatus according to the present disclosure has been described with reference to a plurality of embodiments as above, the present disclosure is not limited to these embodiments. For example, other embodiments with any combinations of the constituent elements described in the description or without a part of the constituent elements are also embodiments of the present disclosure. Variations including various modifications made to the embodiments by those skilled in the art are possible in the embodiments without departing from the scope of the present disclosure, in other words, the recitation in the claims.

It should be noted that the following embodiments may also be included in one or more embodiments of the present disclosure.

(1) A part of the constituent elements included in the above-described signal processing apparatus may be a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the constituent elements to execute their functions. Here, the computer program includes combinations of instruction codes for issuing instructions to the computer to execute predetermined functions.

(2) It should also be noted that a part or all of the constituent elements in the signal processing apparatus may be implemented into a single Large Scale Integration (LSI). The system LSI is a super multi-function LSI that is a single chip into which a plurality of constituent elements are integrated. More specifically, the system LSI is a computer system including a microprocessor, a ROM, a RAM, and the like. The RAM or the hard disk unit holds a computer program. The microprocessor operates according to the computer program, thereby causing each of the constituent elements to execute their functions.

(3) It should also be noted that a part or all of the constituent elements included in the above-described signal processing apparatus may be implemented into an Integrated Circuit (IC) card or a single module which is attachable to and removable from the signal processing apparatus. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

(4) It should also be noted that a part or all of the constituent elements included in the above-described signal processing apparatus may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-Ray® Disc), and a semiconductor memory. The present disclosure may be the digital signals recorded on the recording medium.

It should also be noted in a part or all of the constituent elements included in the above-described signal processing apparatus that the computer program or the digital signals may be transmitted via an electric communication line, a wired or wireless communication line, a network represented by the Internet, data broadcasting, and the like.

(5) It should also be noted that the present disclosure may be the above-described method. The present disclosure may be a computer program causing a computer to execute the method, or digital signals indicating the computer program.

(6) It should also be noted that the present disclosure may be a computer system including a microprocessor operating according to the computer program and a memory storing the computer program.

(7) It should also be noted that the program or the digital signals may be recorded onto the recording medium to be transferred, or may be transmitted via a network or the like, so that the program or the digital signals can be executed by a different independent computer system.

(8) It should also be noted that the above-described embodiments and their variations may be combined.

Although only some exemplary embodiments of the present disclosure have been described in detail above, those skilled in the art will readily appreciate that many variations are possible in the exemplary embodiments without materially departing from the novel teachings and advantages of the present disclosure. Accordingly, all such variations are intended to be included within the scope of the present disclosure.

INDUSTRIAL APPLICABILITY

Since the signal processing apparatus of the present disclosure can reproduce a music content including a sound signal whose high frequency components are not sufficiently recorded with high sound quality, the signal processing apparatus can be utilized for an information terminal such as a smart phone and a tablet, a television receiver connectable to the Internet, reproduction equipment such as a DVD/BRD, a smart speaker, etc.

The invention claimed is:

1. A signal processing apparatus comprising:
a complementary bandwidth determination unit that determines a first reference frequency and a bandwidth based on a frequency signal of sound stored in a memory;
a first coefficient stream output unit that outputs a first coefficient stream, the first coefficient stream having values assigned to signal streams of a plurality of harmonics appearing in the frequency signal, the values including a maximum value equal to or less than 1 and other values smaller than the maximum value, the maximum value being assigned to a first signal stream closest to the first reference frequency among the signal streams, the other values being assigned to other signal streams among the signal streams, each of the other values decreasing as a corresponding one of the other signal streams is more distant from the first reference frequency;

a first signal stream generation unit that generates a folding signal stream by performing both of multiplication processing and folding processing using the first reference frequency as an upper limit frequency of the frequency signal, the multiplication processing being processing for multiplying a second signal stream among the signal streams by the first coefficient stream, the folding processing being processing for folding the second signal stream to a frequency domain higher than the first reference frequency to be symmetric with respect to the first reference frequency as a symmetry axis, the second signal stream having the bandwidth determined by the complementary bandwidth determination unit on a lower frequency side than the upper limit frequency; and a first signal output unit that outputs complemented frequency signal by replacing a third signal stream among the signal streams by the folding signal stream using the first reference frequency set as a lower limit frequency of the frequency signal, the third signal stream having the bandwidth on a higher frequency side than the lower limit frequency.

2. The signal processing apparatus according to claim 1, further comprising:

a second coefficient stream output unit that outputs a second coefficient stream, the second coefficient stream having values assigned to signal streams of a plurality of harmonics appearing in the complemented frequency signal, the values including a maximum value equal to or less than 1 and other values smaller than the maximum value, the maximum value being assigned to a fourth signal stream closest to a second reference frequency among the signal streams of the plurality of harmonics appearing in the complemented frequency signal, the other values being assigned to other signal streams among the signal streams of the plurality of harmonics appearing in the complemented frequency signal, each of the other values decreasing as a corresponding one of the other signal streams is more distant from the second reference frequency, the second reference frequency being obtained by adding the bandwidth determined by the complementary bandwidth determination unit to the first reference frequency;

a second signal stream generation unit that generates a complemented folding signal stream by performing both of multiplication processing and folding processing using the second reference frequency as an upper limit frequency of the complemented frequency signal, the multiplication processing being processing for multiplying a fifth signal stream among the signal streams of the plurality of harmonics appearing in the complemented frequency signal by the second coefficient stream, the folding processing being processing for folding the fifth signal stream to a frequency domain higher than the second reference frequency to be symmetric with respect to the second reference frequency as a symmetry axis, the fifth signal stream having the bandwidth on a lower frequency side than the upper limit frequency; and a second signal output unit that outputs further complemented frequency signal by replacing a sixth signal stream among the signal streams of the plurality of harmonics appearing in the complemented frequency signal by the complemented folding signal stream using the second reference frequency set as a lower limit frequency of the complemented frequency signal, the sixth signal stream having the bandwidth on a higher frequency side than the lower limit frequency.

3. The signal processing apparatus according to claim 2, wherein a gradient of the second coefficient stream is smaller than a gradient of the first coefficient stream.

4. The signal processing apparatus according to claim 1, wherein the complementary bandwidth determination unit determines, as the first reference frequency, a frequency with which a deterioration of energy of frequency components appearing in the frequency signal is 18 dB or more.

5. The signal processing apparatus according to claim 4, wherein the complementary bandwidth determination unit determines the bandwidth according to a value of the first reference frequency.

6. The signal processing apparatus according to claim 4, wherein, when the first reference frequency is lower than a predetermined frequency, the complementary bandwidth determination unit makes the bandwidth narrower than a bandwidth determined when the first reference frequency is equal to the predetermined frequency.

7. The signal processing apparatus according to claim 1, further comprising:

a frequency conversion unit that converts a time axis signal of the sound into the frequency signal of the sound; and a frequency inverse conversion unit that inversely converts the complemented frequency signal output from the first signal output unit into a time axis signal of the sound, and outputs the time axis signal, wherein the memory stores the frequency signal output from the frequency conversion unit.

8. The signal processing apparatus according to claim 7, wherein the first signal stream generation unit generates each of frequency components of an output signal of the first signal stream generation unit by multiplying a complex conjugate number of each of the frequency components by the first coefficient stream, the complex conjugate number corresponding to a corresponding one of an input signal of the first signal stream generation unit.

9. A signal processing apparatus comprising:

a complementary bandwidth determination unit that determines a first reference frequency and a bandwidth based on a frequency signal of sound stored in a memory;

a first coefficient stream output unit that outputs a first coefficient stream, the first coefficient stream having values assigned to signal streams of a plurality of harmonics appearing in the frequency signal, the values including a maximum value equal to or less than 1 and other values smaller than the maximum value, the maximum value being assigned to a first signal stream closest to the first reference frequency among the signal streams, the other values being assigned to other signal streams among the signal streams, each of the other values decreasing as a corresponding one of the other signal streams is more distant from the first reference frequency;

a first signal stream generation unit that generates a folding signal stream by performing both of multiplication processing and folding processing using the first reference frequency as an upper limit frequency of the frequency signal, the multiplication processing being processing for multiplying a second signal stream among the signal streams by the first coefficient stream, the folding processing being processing for folding the second signal stream to a frequency domain higher than the first reference frequency to be symmetric with respect to the first reference frequency as a symmetry axis, the second signal stream having the bandwidth determined by the complementary bandwidth determination unit on a lower frequency side than the upper limit frequency; and a first signal output unit that outputs complemented frequency signal by adding the folding signal stream to a third signal stream among the signal streams using the first reference frequency set as a lower limit frequency of the frequency signal, the third signal stream having the bandwidth on a higher frequency side than the lower limit frequency.

10. The signal processing apparatus according to claim 9, further comprising:

a second coefficient stream output unit that outputs a second coefficient stream, the second coefficient stream having values assigned to signal streams of a plurality of harmonics appearing in the complemented frequency signal, the values including a maximum value equal to or less than 1 and other values smaller than the maximum value, the maximum value being assigned to a fourth signal stream closest to a second reference frequency among the signal streams of the plurality of harmonics appearing in the complemented frequency signal, the other values being assigned to other signal streams among the signal streams of the plurality of harmonics appearing in the complemented frequency signal, each of the other values decreasing as a corresponding one of the other signal streams is more distant from the second reference frequency, the second reference frequency being obtained by adding the bandwidth determined by the complementary bandwidth determination unit to the first reference frequency;

a second signal stream generation unit that generates a complemented folding signal stream by performing both of multiplication processing and folding processing using the second reference frequency as an upper limit frequency of the complemented frequency signal, the multiplication processing being processing for multiplying a fifth signal stream among the signal streams of the plurality of harmonics appearing in the complemented frequency signal by the second coefficient stream, the folding processing being processing for folding the fifth signal stream to a frequency domain higher than the second reference frequency to be symmetric with respect to the second reference frequency as a symmetry axis, the fifth signal stream having the bandwidth on a lower frequency side than the upper limit frequency; and a second signal output unit that outputs further complemented frequency signal by adding the complemented folding signal stream to a sixth signal stream among the signal streams of the plurality of harmonics appearing in the complemented frequency signal using the second reference frequency set as a lower limit frequency of the complemented frequency signal, the sixth signal stream having the bandwidth on a higher frequency side than the lower limit frequency.

11. The signal processing apparatus according to claim 10, wherein a gradient of the second coefficient stream is smaller than a gradient of the first coefficient stream.

12. A signal processing method of processing a frequency signal, the signal processing method comprising:

determining a reference frequency and a bandwidth based on the frequency signal of sound stored in a memory;

outputting a coefficient stream, the coefficient stream having values assigned to signal streams of a plurality of harmonics appearing in the frequency signal, the values including a maximum value equal to or less than 1 and other values smaller than the maximum value, the maximum value being assigned to a first signal stream closest to the reference frequency among the signal streams, the other values being assigned to other signal streams among the signal streams, each of the other values decreasing as a corresponding one of the other signal streams is more distant from the reference frequency;

generating a folding signal stream by performing both of multiplication processing and folding processing using the reference frequency as an upper limit frequency of the frequency signal, the multiplication processing being processing for multiplying a second signal stream among the signal streams by a corresponding one of the values of the coefficient stream, the folding processing being processing for folding the second signal stream to a frequency domain higher than the reference frequency to be symmetric with respect to the reference frequency as a symmetry axis, the second signal stream having the bandwidth determined in the determining on a lower frequency side than the upper limit frequency; and outputting complemented frequency signal by replacing a third signal stream among the signal streams by the folding signal stream using the reference frequency set as a lower limit frequency of the frequency signal, the third signal stream having the bandwidth on a higher frequency side than the lower limit frequency.

13. A signal processing method of processing a frequency signal, the signal processing method comprising:

determining a reference frequency and a bandwidth based on the frequency signal of sound stored in a memory;

outputting a coefficient stream, the coefficient stream having values assigned to signal streams of a plurality of harmonics appearing in the frequency signal, the values including a maximum value equal to or less than 1 and other values smaller than the maximum value, the maximum value being assigned to a first signal stream closest to the reference frequency among the signal streams, the other values being assigned to other signal streams among the signal streams, each of the other values decreasing as a corresponding one of the other signal streams is more distant from the reference frequency;

generating a folding signal stream by performing both of multiplication processing and folding processing using the reference frequency as an upper limit frequency of the frequency signal, the multiplication processing being processing for multiplying a second signal stream among the signal streams by a corresponding one of the values of the coefficient stream, the folding processing being processing for folding the second signal stream to a frequency domain higher than the reference frequency to be symmetric with respect to the reference frequency as a symmetry axis, the second signal stream having the bandwidth determined in the determining on a lower frequency side than the upper limit frequency; and outputting complemented frequency signal by adding the folding signal stream to a third signal stream among the signal streams using the reference frequency set as a lower limit frequency of the frequency signal, the third signal stream having the bandwidth on a higher frequency side than the lower limit frequency.

* * * * *